(12) United States Patent
Sabry et al.

(10) Patent No.: US 9,158,109 B2
(45) Date of Patent: Oct. 13, 2015

(54) ASPHERICAL OPTICAL SURFACES AND OPTICAL SCANNERS

(71) Applicant: Si-Ware Systems, Cairo (EG)

(72) Inventors: Yasser M. Sabry, Cairo (EG); Diaa Abdel Maged Khalil, Cairo (EG); Bassam A. Saadany, Cairo (EG); Tarik E. Bourouina, Joinville (FR)

(73) Assignee: SI-WARE SYSTEMS, Cairo (EG)

(*) Notice: Subject to any disclaimer, the term of this patent is extended or adjusted under 35 U.S.C. 154(b) by 149 days.

(21) Appl. No.: 13/943,846

(22) Filed: Jul. 17, 2013

(65) Prior Publication Data
US 2014/0022618 A1   Jan. 23, 2014

Related U.S. Application Data

(60) Provisional application No. 61/673,663, filed on Jul. 19, 2012.

(51) Int. Cl.
*G02B 26/10* (2006.01)
*G02B 5/10* (2006.01)

(52) U.S. Cl.
CPC *G02B 26/10* (2013.01); *G02B 5/10* (2013.01); *G02B 26/101* (2013.01)

(58) Field of Classification Search
CPC .............................. G02B 26/08; G02B 26/10
USPC .......... 359/201.2, 202.1, 207.2, 207.3, 207.4, 359/207.5, 208.2
See application file for complete search history.

(56) References Cited

U.S. PATENT DOCUMENTS

| | | | |
|---|---|---|---|
| 6,172,825 B1 | 1/2001 | Takahashi | |
| 7,149,022 B2 | 12/2006 | Mun et al. | |
| 8,115,981 B2 | 2/2012 | Kato | |
| 2003/0077020 A1 | 4/2003 | Stewart et al. | |
| 2007/0182938 A1 | 8/2007 | Imaoka | |
| 2010/0265382 A1* | 10/2010 | Khalil et al. | 348/335 |

FOREIGN PATENT DOCUMENTS

EP   1635209 A2   3/2006

OTHER PUBLICATIONS

Bourouina, Tarik et al; "The MEMSNAS Process: Microloading Effect for Micromachining 3-D Structures of Nearly All Shapes"; Journal of Microelectromechanical Systems, vol. 13, No. 2; Apr. 2004; pp. 190-199.
International Searching Authority; International Search Report and Written Opinion; International Application No. PCT/US13/051053; Apr. 25, 2014; 20 pgs.
International Searching Authority; International Application No. PCT/US13/51053; Partial International Search Report; Nov. 13, 2013; 2 pgs.

* cited by examiner

*Primary Examiner* — Scott J Sugarman
*Assistant Examiner* — Ephrem Mebrahtu
(74) *Attorney, Agent, or Firm* — Holly L. Rudnick; Loza & Loza, LLP

(57) ABSTRACT

Optical systems with aspherical optical elements are described. The aspherical optical elements have surfaces in which the in-plane radius of curvature spatially varies and the in-plane cross section surface profile is characterized in that the multiplication of the cosine of the incidence angle raised to a non-zero exponent by the in-plane radius of curvature varies less than twenty percent between any two points on the in-plane cross section surface profile.

30 Claims, 25 Drawing Sheets

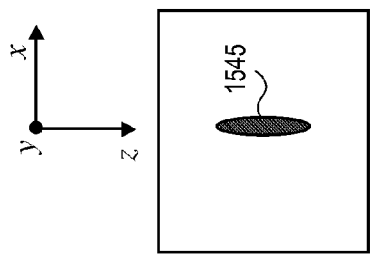
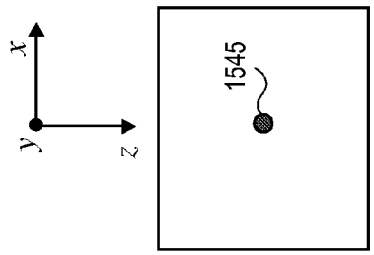
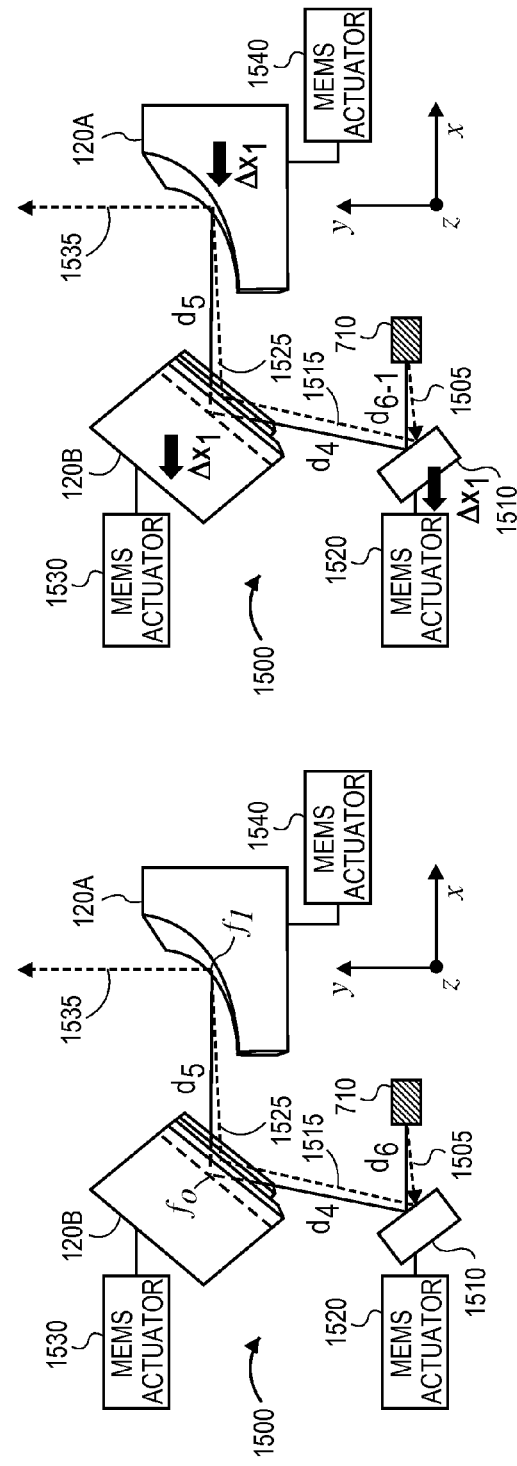
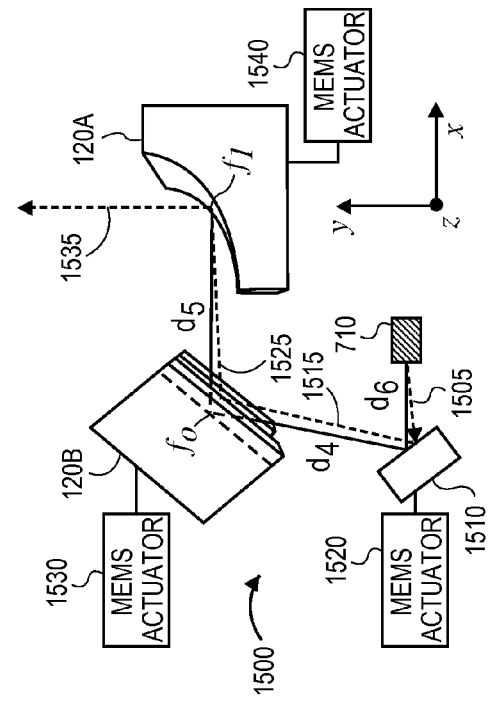
FIG. 15A
FIG. 15B

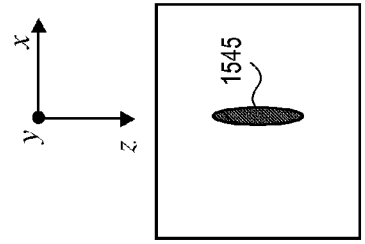
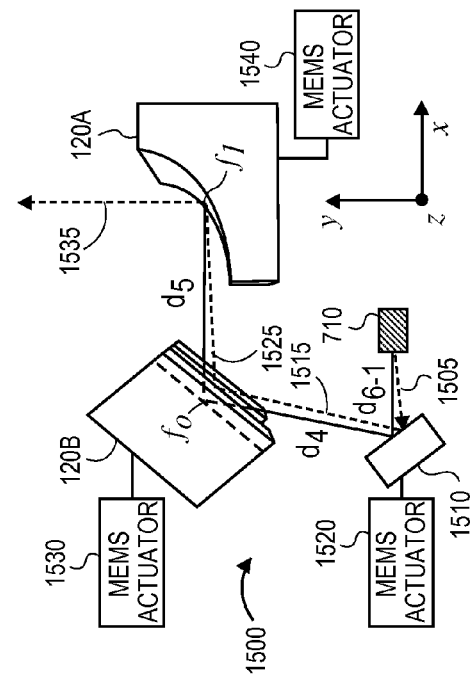
FIG. 15D
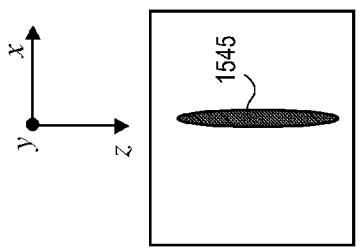
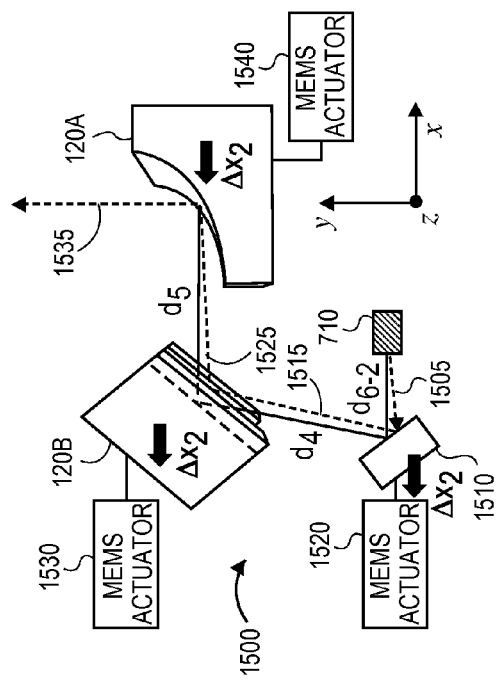
FIG. 15C

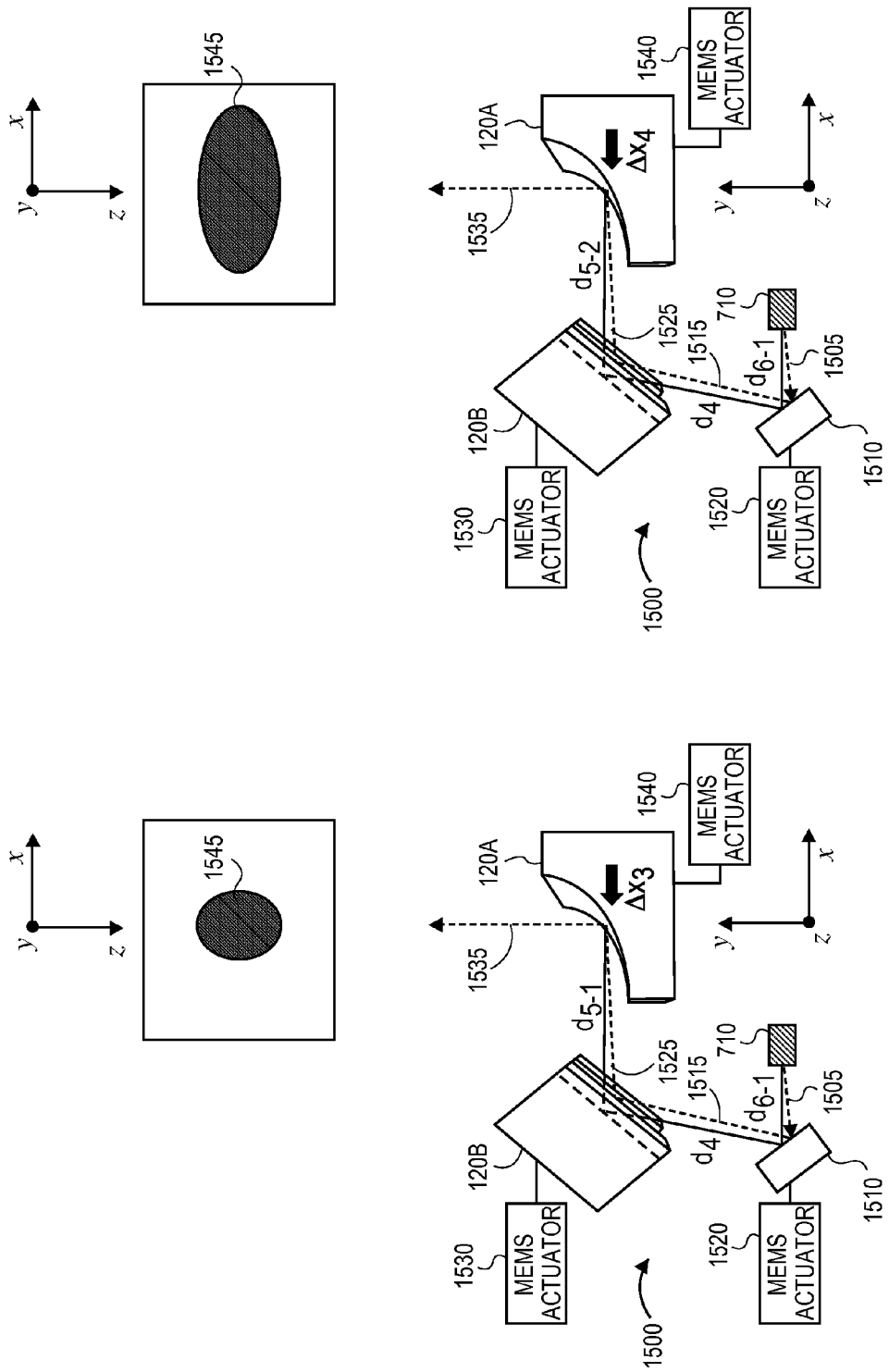

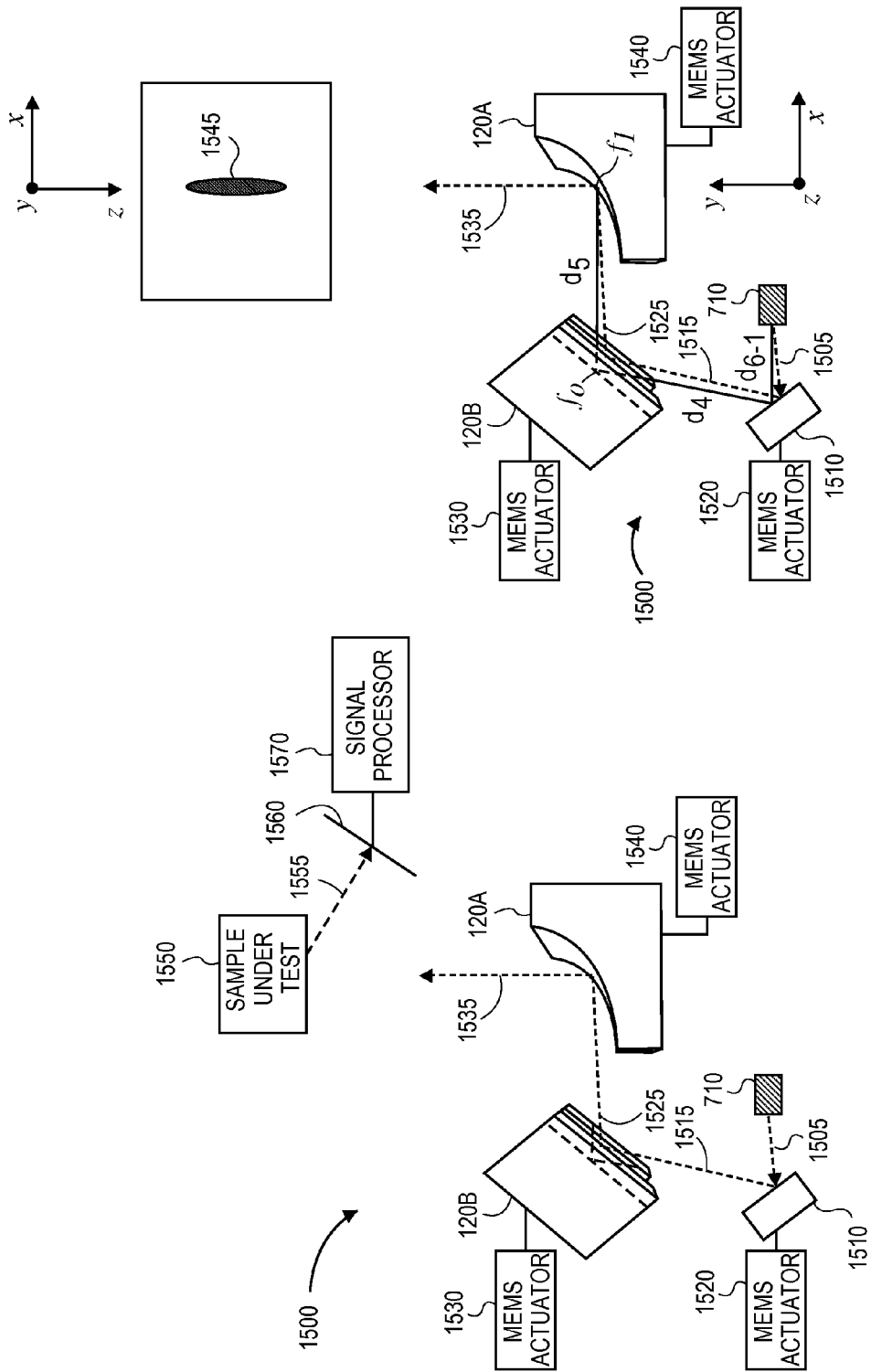

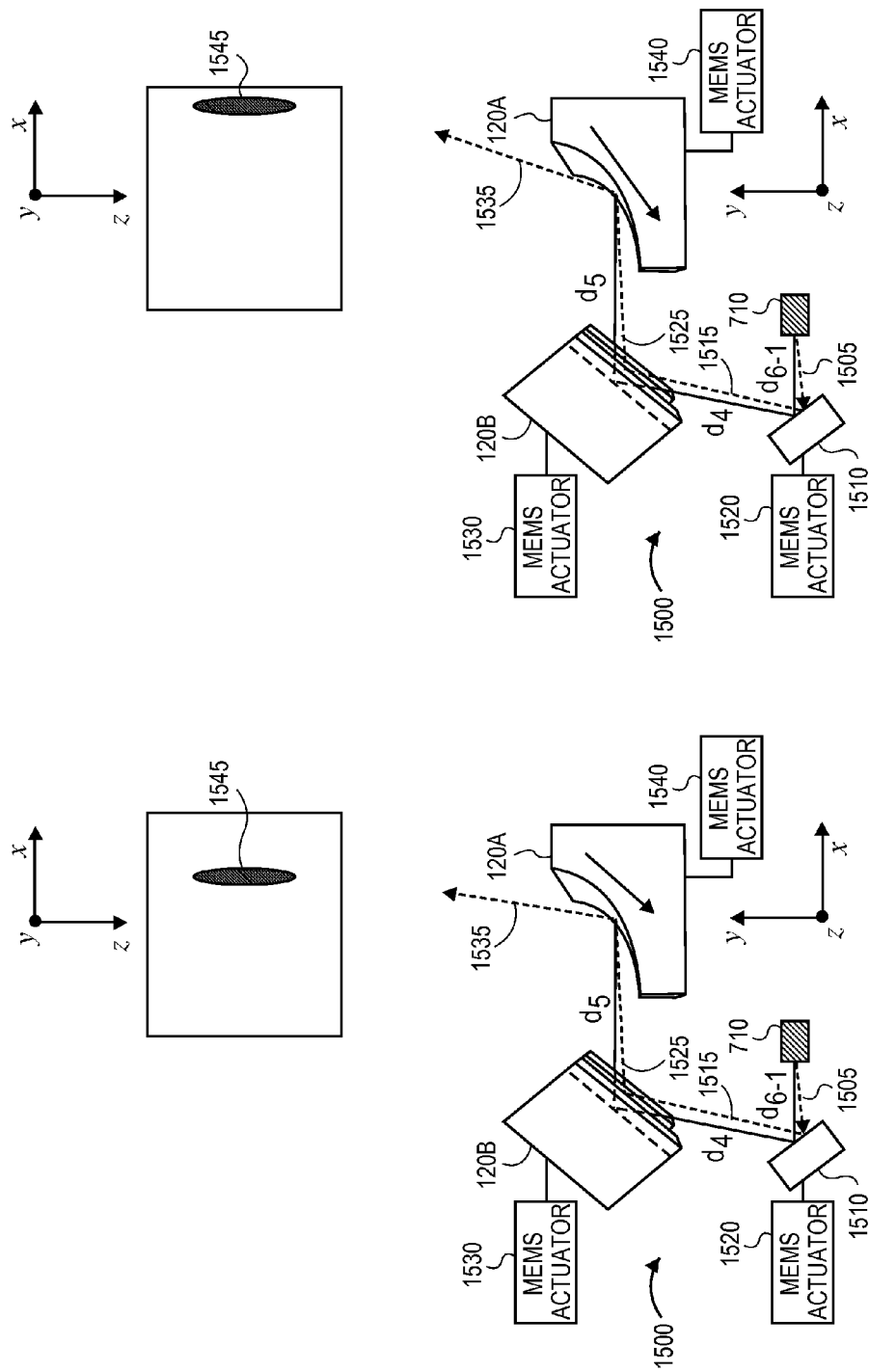

ASPHERICAL OPTICAL SURFACES AND OPTICAL SCANNERS

CROSS REFERENCE TO RELATED PATENTS

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Application Ser. No. 61/673,663, entitled "Aspherical Optical Surfaces and Optical Scanners," filed Jul. 19, 2012.

BACKGROUND OF THE INVENTION

1. Technical Field of the Invention

The present invention relates in general to optical systems, and in particular to optical systems including aspherical optical elements.

2. Description of Related Art

Aspherical or acylindrical optical elements have optical surfaces with profiles that do not form a portion of sphere or cylinder, respectively. The most common fabrication methods for aspherical or acylindrical optical elements include molding (for small size aspherical surfaces) and grinding and polishing (for larger surfaces). Aspherical or acylindrical optical elements are typically used for reducing optical aberration, optical system size, weight and manufacturing cost in various applications, such as optical scanning and beam shaping.

In optical scanner systems, the three basic scanning configurations are: objective scanning, post-objective scanning and pre-objective scanning. In objective scanning, the objective or the light source or both are moved. The movement can be, for example, a rotation about a remote axis or a translational motion. The moving objective can include a reflective mirror, a refractive lens, or a diffractive element. In such systems, the objectives are typically displaced a short distance relative to their focal length to avoid output beam distortion and varying spot size from one scanning angle to another. Thus, the resulting beam scanning angle is typically limited to 30-40°, which is considered to be a wide angle for a microsystem scanner Angles larger than 40° typically produce severe spot size distortion.

In pre-objective and post-objective scanning, the optical beam is rotated by reflection from a flat rotating mirror (or polygon) either before or after the objective lens, respectively. Aspherical surfaces are typically utilized in the pre-objective scanning configuration to form an "f-theta lens," which produces uniform or close to uniform beam size in order to focus the scanned beam on a flat plane instead of a curved plane.

What is needed is a type of optical surface that can produce larger scanning angles and be utilized in any type of scanning configuration.

SUMMARY OF THE INVENTION

Embodiments of the present invention provide an optical system including an optical reflecting element having a surface with an aspherical shape. The optical reflecting element has a principal axis perpendicular to the surface that intersects the surface at a vertex thereof. The surface is further rotationally asymmetric around the principal axis. The optical reflecting element is optically coupled to receive an incident beam at an incidence angle with respect to the surface. The surface has an in-plane radius of curvature that spatially varies in an in-plane direction, in which the in-plane direction corresponds to a plane including the incident beam and the perpendicular to the surface at the incidence point. The optical reflecting element further has an in-plane cross section surface profile in the in-plane direction that is characterized in that the multiplication of the cosine of the incidence angle raised to a non-zero exponent by the in-plane radius of curvature varies less than twenty percent between any two points on the in-plane cross section surface profile.

BRIEF DESCRIPTION OF THE DRAWINGS

A more complete understanding of the present invention may be obtained by reference to the following detailed description when taken in conjunction with the accompanying drawings wherein:

FIGS. 15A-15J illustrate an exemplary optical system for providing beam focusing/defocusing and angular deflection using moveable aspherical optical elements, in accordance with embodiments of the present invention;

DETAILED DESCRIPTION OF THE DRAWINGS

In accordance with embodiments of the present invention, a new class of optical elements is provided having surface profiles that are acylindrical/aspherical (hereinafter referred to collectively as "aspherical"). Traditional optical surface profiles are typically defined as a series of rotationally symmetric polynomials. By contrast, the aspherical optical surface profiles presented herein are described by their differential/analytical equations and/or by tabulated numerical data. Such optical surface profiles have distinctive features in terms of their radius of curvature and the slope of the surface with respect to the incidence angle. The optical elements can be used in either a refraction or reflection manner.

The aspherical optical elements presented herein can be used as objectives lenses/mirrors in an objective scanning configuration or for replacing the flat rotating mirrors in a pre-objective or post-objective scanning configuration. For example, in objective scanning configurations, the aspherical optical elements may be allowed to be displaced a distance that is comparable and up to twice their focal length, while producing scanning angles up to 170° with high performance regarding the scanned beam spot size and collimation. Such scanning configurations may involve active scanning, where light is directed to different portions of an object, or passive scanning, where the radiated light from different portions of a remote object is directed onto a detector.

In exemplary embodiments, optical scanning is achieved using the aspherical optical element(s) to steer an optical beam in 1-D or 2-D space, while maintaining beam collimation and/or beam focusing across the scanning angles. In other exemplary embodiments, optical scanning is achieved using the aspherical optical element(s) to transform the optical spot with arbitrary shape to another optical spot with a specific shape, such as, for example, the transformation from a spherical Gaussian beam to an elliptical Gaussian beam.

Optical systems including the aspherical optical elements can be fabricated, for example, using photolithography and silicon etching technology. When fabricated using Micro Electro-Mechanical Systems (MEMS) technology involving deep silicon anisotropic etching with or without isotropic etching, the aspherical optical elements presented herein may be configured to process optical beams propagating in-plane of the wafer substrate. In-plane processing allows for low-cost, batch-fabricated monolithic microsystems with lithographic alignment. Such microsystems have direct applications in, for example, barcode scanners, printers, optical coherence tomography and vehicle distance detection system. In addition, such aspherical optical elements can also be used in optical beam shaping, optical mode matching and optimized coupling between optical systems.

Figure 1A:
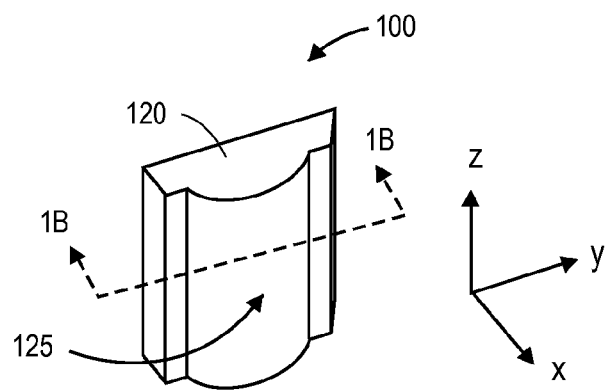
FIG. 1A illustrates exemplary optical system including an aspherical optical element, in accordance with embodiments of the present invention.

Referring now to FIGS. 1A-1D, there is illustrated an exemplary optical system 100, in accordance with embodiments of the present invention. As shown in FIG. 1A, the optical system 100 includes an optical element 120 having an aspherical optical surface 125. As used herein, the term "aspherical optical surface" refers to a surface 125 with an aspherical shape that is rotationally asymmetric around its principal axis (i.e., the surface has non-circular symmetry around the principal axis). The surface 125 may be a reflecting or refracting surface, the former being illustrated. For example, in embodiments in which the surface 125 is a reflecting surface, the surface 125 may be a mirrored surface formed by selective metallization of the surface or by etching of a silicon substrate to produce a Bragg mirror as the reflecting optical element 120. In embodiments in which the surface 125 is a refracting surface, the optical element 120 may be formed from, for example, micromachined or assembled glass or by etching a silicon substrate to produce the refracting optical element 120 in silicon.

Figure 1B:
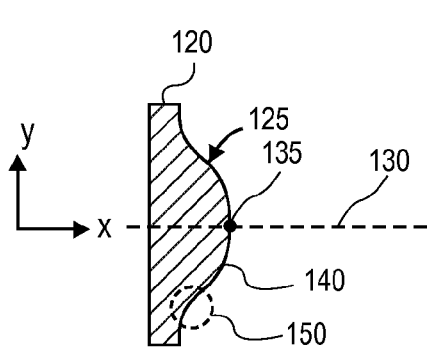
FIG. 1B is a cross-sectional view of the aspherical optical element, in accordance with embodiments of the present invention.

A cross-sectional view of the optical reflecting element 120 in the in-plane direction is shown in FIG. 1B. As used herein, the term "in-plane" refers to the plane that contains the perpendicular (normal) to the optical surface 125 at the incidence point and that contains the incident beam axis. In the example shown in FIGS. 1A-1C, the "in-plane" direction corresponds to the x-y plane, where x and y define an orthogonal coordinate system. In addition, as used herein, the term "out-of-plane" direction refers to the plane that is perpendicular (normal) to the in-plane direction and that includes the incident beam axis. In the example shown in FIGS. 1A-1C, the "out-of-plane" direction corresponds to the x-z plane, where z is a third coordinate axis orthogonal to both x and y, thus forming a three-dimensional Cartesian coordinate system. It should be noted that although Cartesian coordinates are used to describe the surfaces and their motion mechanisms herein, the use of other coordinate systems is possible by carrying out the appropriate transformation.

As can be seen in FIG. 1B, the principal axis 130 of the aspherical optical element 120 intersects the aspherical optical surface 125 in the in-plane direction at a vertex 135 of the aspherical optical surface 125. The aspherical optical surface 125 further has a surface profile 140 that can be described by a differential/analytical equation and/or by tabulated numerical data, as described in more detail below. As used herein, the term "surface profile" refers to the deviation of the surface 125 in the x-direction along the y-axis. The aspherical optical surface 125 has a radius of curvature that spatially varies along the surface profile 140 in the in-plane direction as $R_i(x,y)$, where y is the distance between a point on the in-plane surface 125 and the principal axis 130 and x is the distance between the projection of that point on the principal axis and the vertex 135.

Figure 1C:
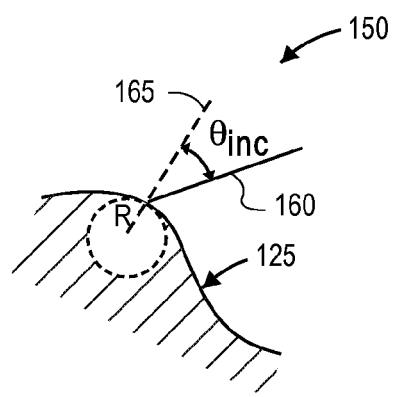
FIGS. 1C and 1D illustrate a radius of curvature of the aspherical optical element, in accordance with embodiments of the present invention.
Figure 1D:
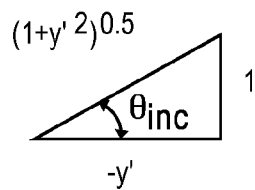

FIG. 1C illustrates an exploded view of a portion 150 of the aspherical optical surface 125. An incident beam 160 is shown incident on the aspherical optical surface 125 at an incidence angle $\theta_{inc}$ determined with respect to a local normal 165 of the aspherical optical surface 125 at the incidence point. The transformation that the incident beam 160 undergoes upon impinging on the optical surface 125 at the incidence point with respect to the in-plane direction is dependent upon the factor $R_i \cos \theta_{inc}$.

For example, as can be seen in FIG. 1C, the local radius of curvature $R_i$ at the incidence point is defined by:

$$R_i = \frac{[1 + y'^2]^{3/2}}{y''} \quad \text{(Equation 1)}$$

where y' is the first derivative of y with respect to x and y'' is the second derivative and x and y are variables of the x-y coordinate system oriented such that the incident beam 160 is incident in parallel with respect to the x-axis. The local radius of curvature $R_i$ can be either positive or negative depending on whether the curvature is viewed from the convex or the concave face of the profile 140.

The tangent of the incidence angle $\theta_{inc}$ of the incident beam 160 is given by the negative of the reciprocal of the slope of the profile at the incidence point. The cosine of the incidence angle $\theta_{inc}$ can then be derived with the aid of the trigonometry triangle shown in FIG. 1D as:

$$\cos(\theta_{inc}) = \frac{-y'}{[1 + y'^2]^{1/2}} \quad \text{(Equation 2)}$$

In accordance with various embodiments, the in-plane surface profile 140 of the optical surface 125 has distinctive features in terms of its radius of curvature $R_i$ and the slope of the surface with respect to the incidence angle $\theta_{inc}$. In particular, the surface profile 140 is characterized in that the multiplication of $R_i(x,y)$ with $\{\cos[\theta_{inc}(x,y)]\}^n$ is constant across the surface profile 140 or allowed to vary less than 20% between any two points on the surface profile 140.

Although the optical reflecting element in FIGS. 1A-1D is shown having a flat out-of-plane surface profile, in other embodiments, the out-of-plane surface profile may also be curved. In embodiments in which the out-of-plane surface profile is curved, the incident beam transformation in the out-of-plane direction is dependent upon the factor $R_o/\cos\theta_{inc}$, where $R_o$ is the surface radii of curvature in the out-of-plane direction.

Figure 2:
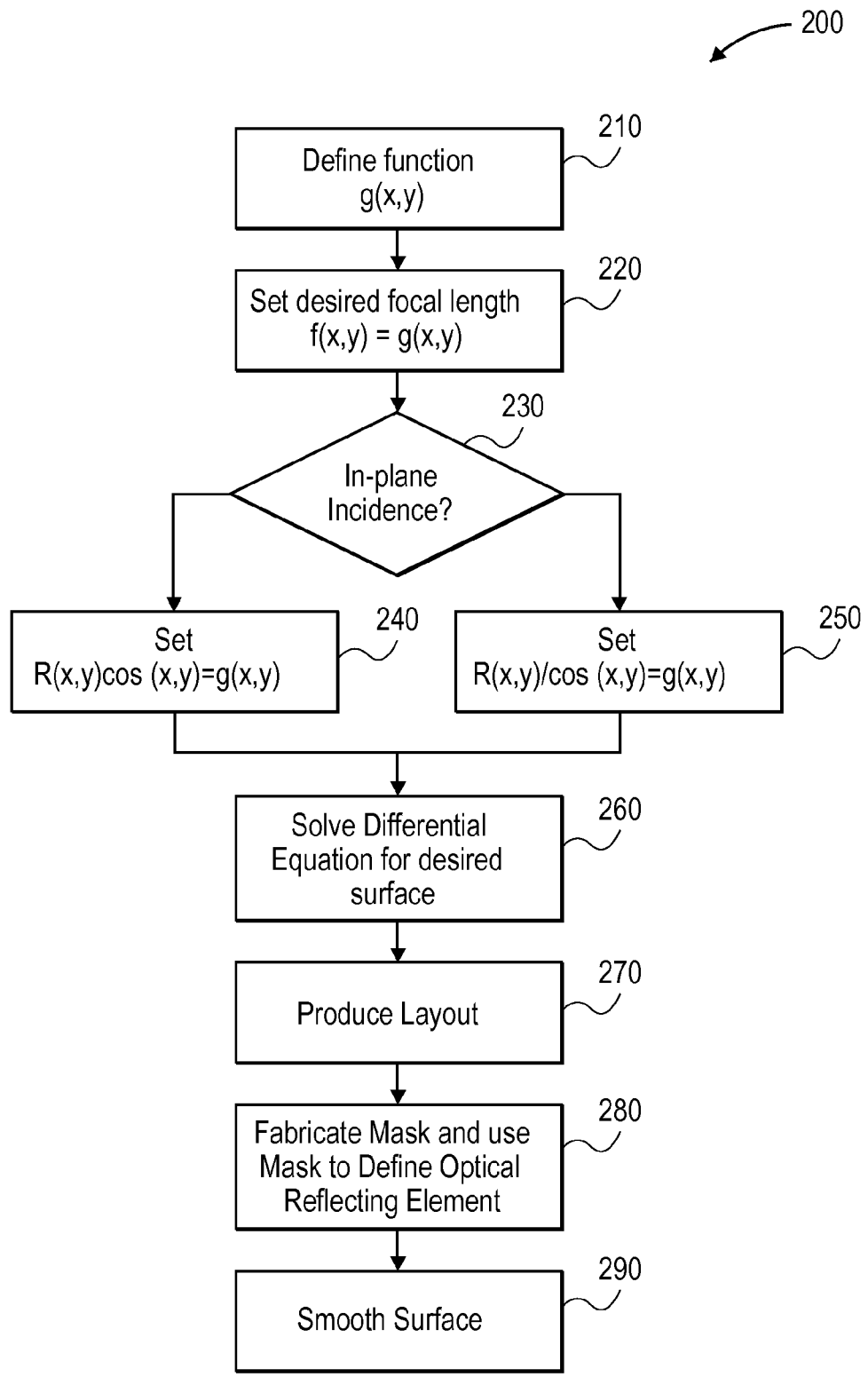
FIG. 2 is a flowchart illustrating an exemplary process for fabricating an aspherical optical element, in accordance with embodiments of the present invention.

FIG. 2 illustrates an exemplary method 200 for the design and production of an aspherical optical element, in accordance with embodiments of the present invention. The method begins at 210, where a function $\{g(x,y)\}$ is defined that enables the optical element to achieve a desired performance metric. At 220, the focal length of the optical element is set equal to this function. If in-plane incidence is desired, at 230 and 240, the focal length is set equal to the surface radius of curvature multiplied by the cosine of the incidence angle. However, if out-of-plane incidence is desired, at 230 and 250, the focal length is set equal to the surface radius of curvature divided by the cosine the incidence angle. Turning the radius of curvature and the cosine of the incidence angle into their mathematical definitions, as described above in Equations (1) and (2), the equality can then be translated to a differential equation.

At 260, the equation is fed to a differential equation analytical or numerical solver, and at 270, the solver output is fed to a layout-editor. The layout is then used at 280 to fabricate a lithographic mask with a given resolution, and the mask is used to define and fabricate the aspherical optical element in conjunction with, for example, deep reactive ion etching (DRIE) technology as well as isotropic etching. It should be understood that the output of the solver can be fed to any surface fabrication technology to produce the desired surface.

At 290, the aspherical surface is then post processed to smooth out the fabricated surface deviation from the originally defined one due to limited resolution in mask fabrication or due to surface roughness resulting from the micromachining process itself.

Figure 5A:
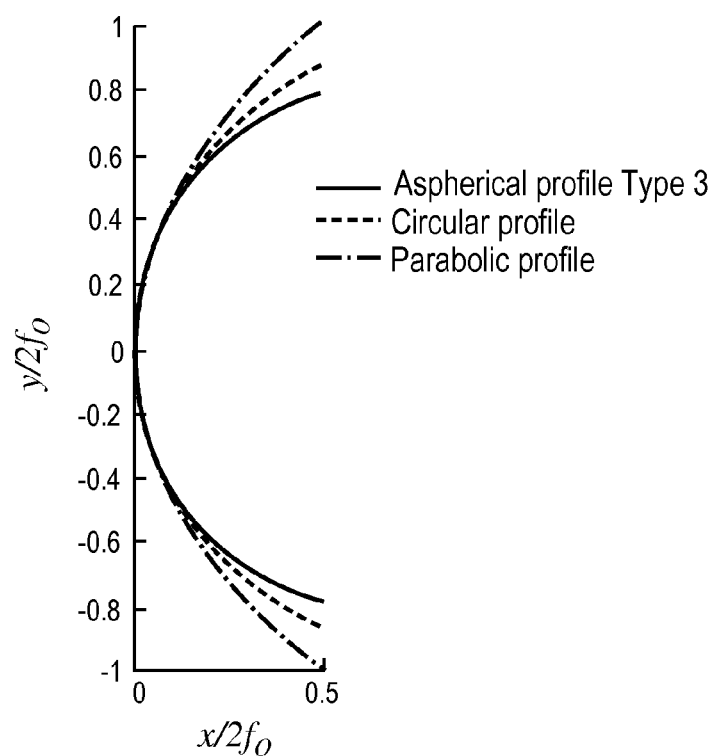
FIGS. 5A-5F illustrate yet another exemplary surface profile of an aspherical optical element, in accordance with embodiments of the present invention.
Figure 5B:
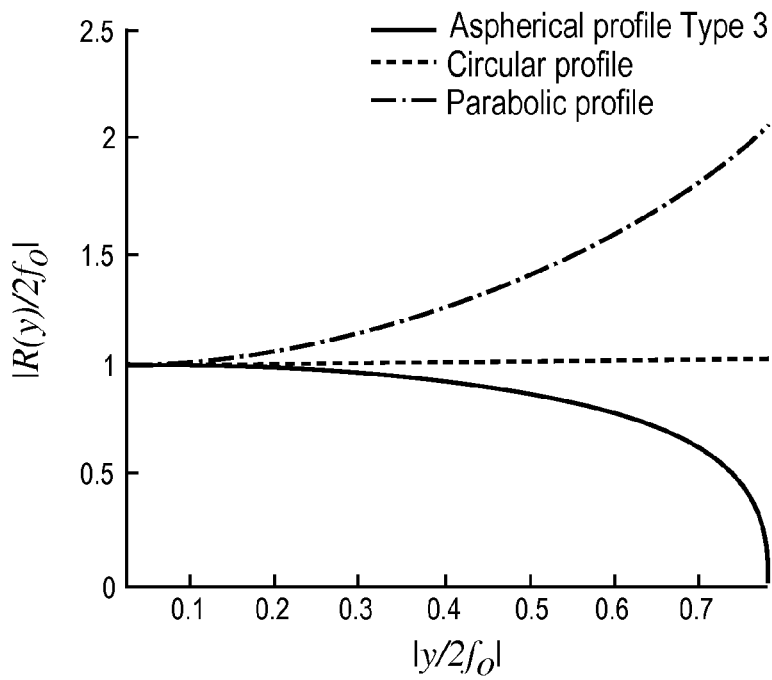
Figure 5C:
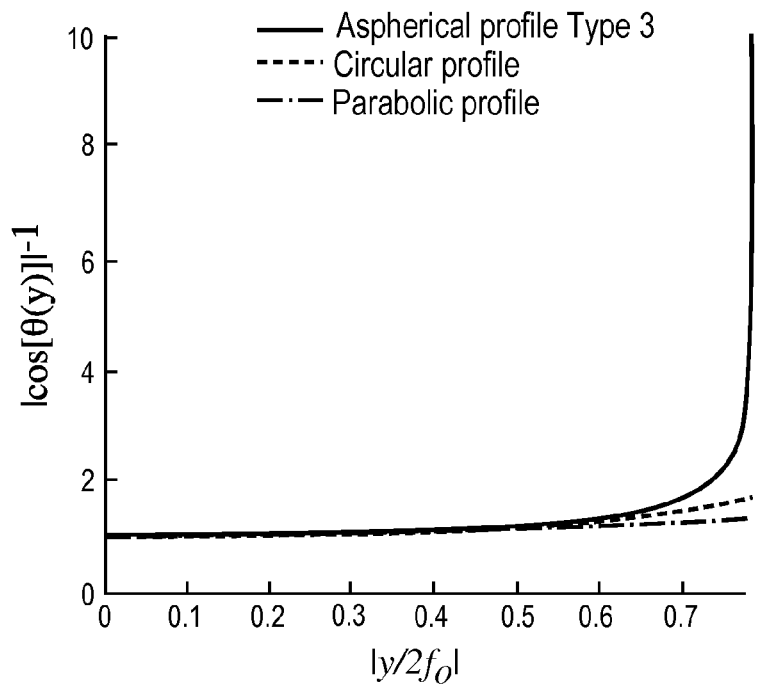
Figure 5D:
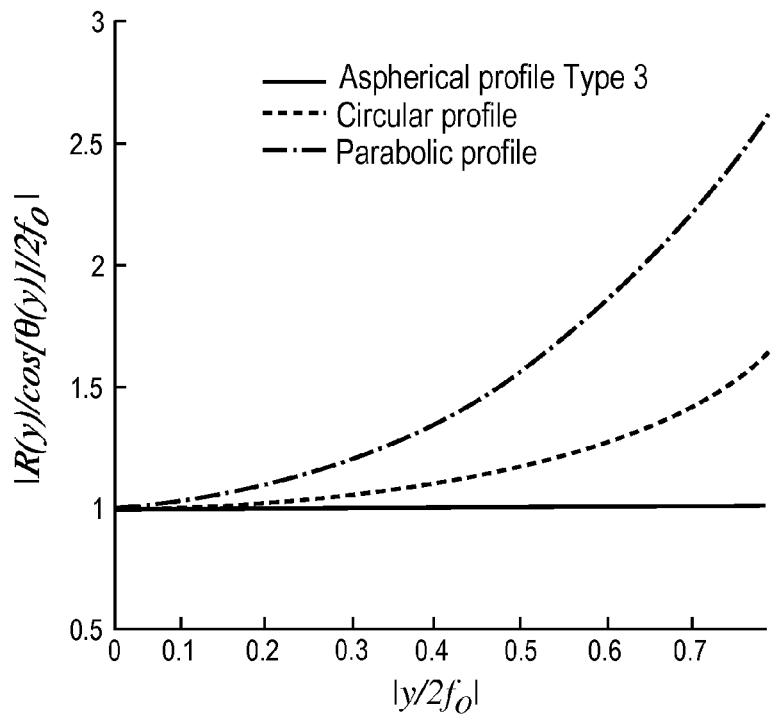
Figure 5E:
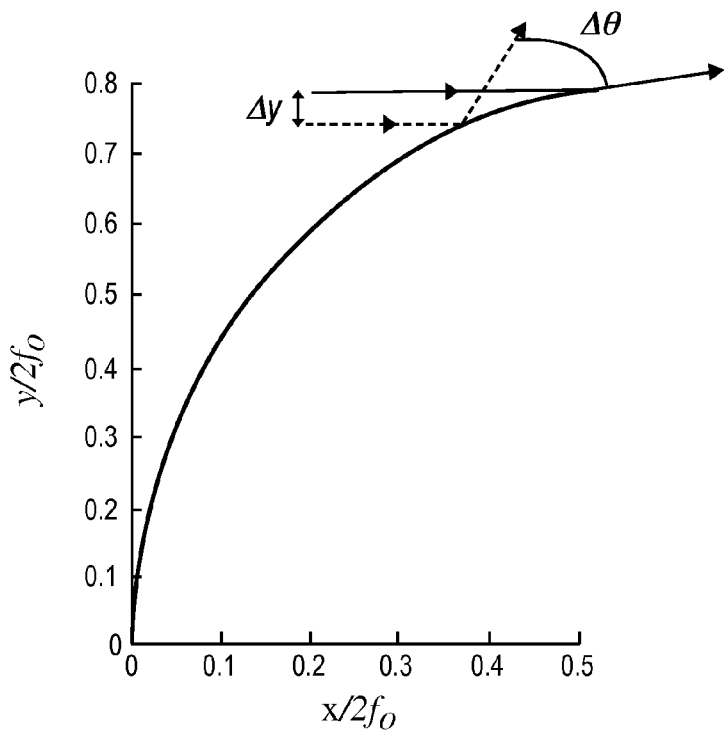
Figure 5F:
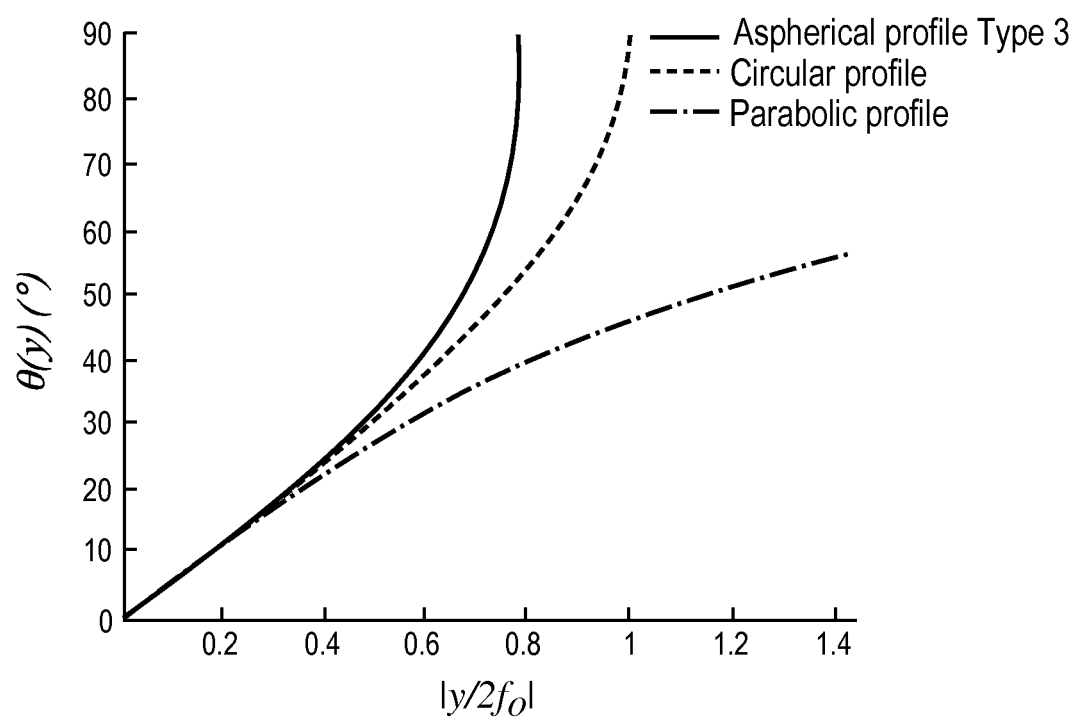
Figure 6:
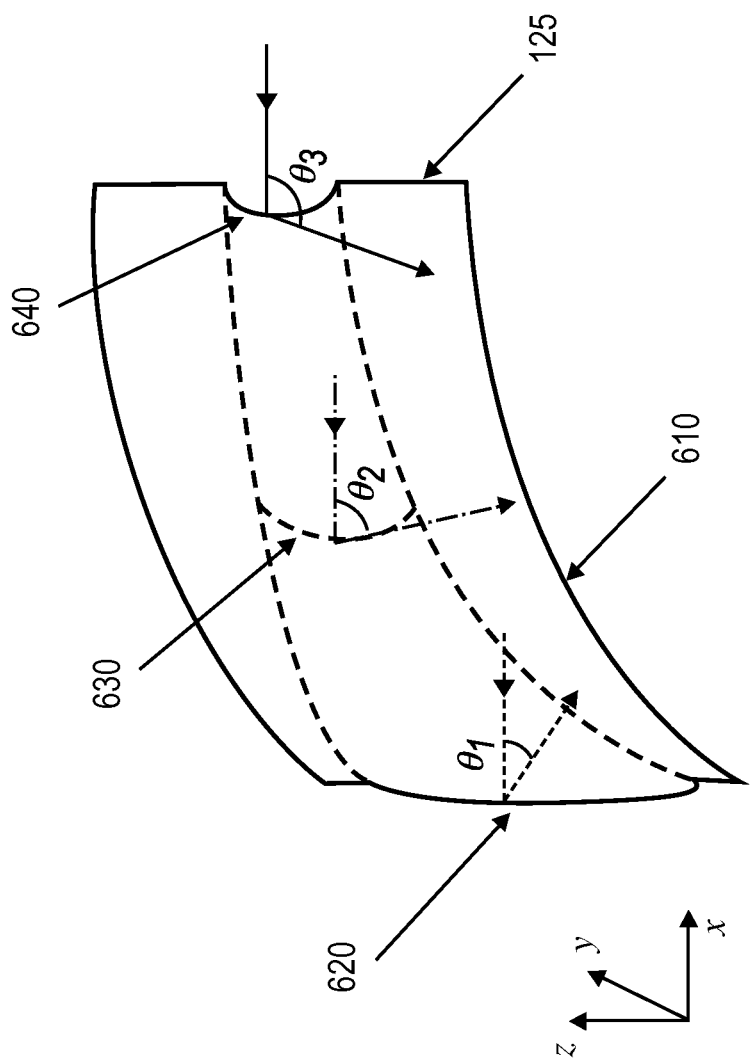
FIG. 6 illustrates still another exemplary surface profile of an aspherical optical element, in accordance with embodiments of the present invention.

Turning now to FIGS. 3-6, four different exemplary aspherical surface types defined by their differential/analytical equations and/or by tabulated numerical data are described. The first three surfaces described with reference to FIGS. 3-5 are presented in two-dimensional (2D) form, while the fourth surface described with reference to FIG. 6 is presented in a three-dimensional (3D) form combining one or more of the presented 2D forms.

Aspherical Surface Profile Type 1

FIGS. 3A-3F illustrate various features of a first aspherical surface profile (Type 1). The in-plane cross section of the aspherical surface profile Type 1 follows the second order non-linear differential equation:

$$2f_o y'' - y'^3 - y' = 0 \quad \text{(Equation 3)}$$

Equation (3) has an exact analytical solution in the form of arctan function with its argument in the form of the square root of an exponential function:

$$y = -2f_o \tan^{-1}\left(e^{-\frac{x_v}{2f_o}}\sqrt{e^{\frac{x}{f_o}} - e^{\frac{x_v}{f_o}}}\right) + y_v \quad \text{(Equation 4)}$$

where $(x_v, y_v)$ is the vertex coordinate of the aspherical optical surface and $f_o$ is a parameter controlling the focal length of the aspherical optical surface. A comparison between the in-plane cross sectional aspherical surface profile Type 1 and the conventional circular as well as the parabolic cross sectional profiles is given in FIG. 3A when $(x_v, y_v) = (0,0)$ for simplicity.

Figure 3A:
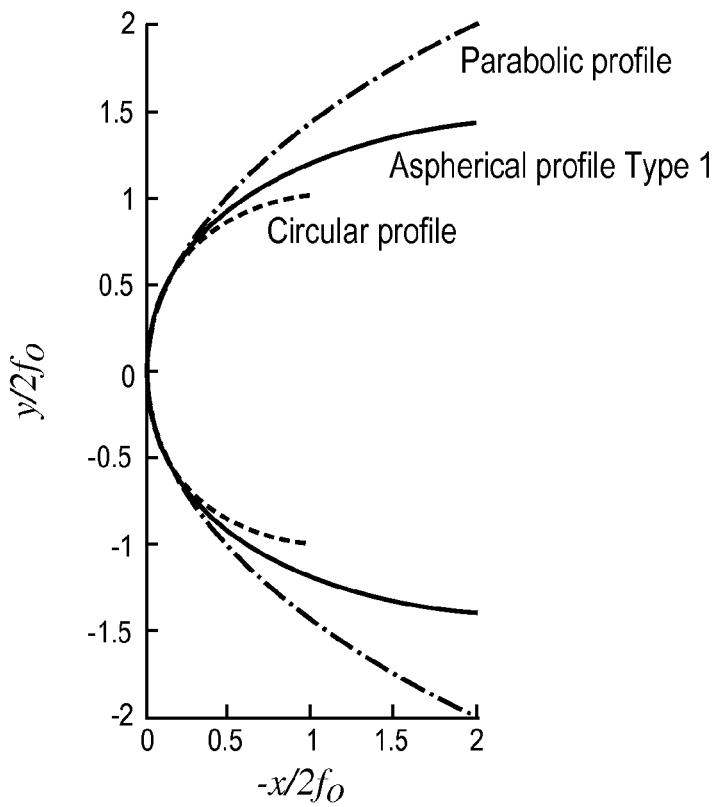
FIGS. 3A-3F illustrate an exemplary surface profile of an aspherical optical element, in accordance with embodiments of the present invention.
Figure 3B:
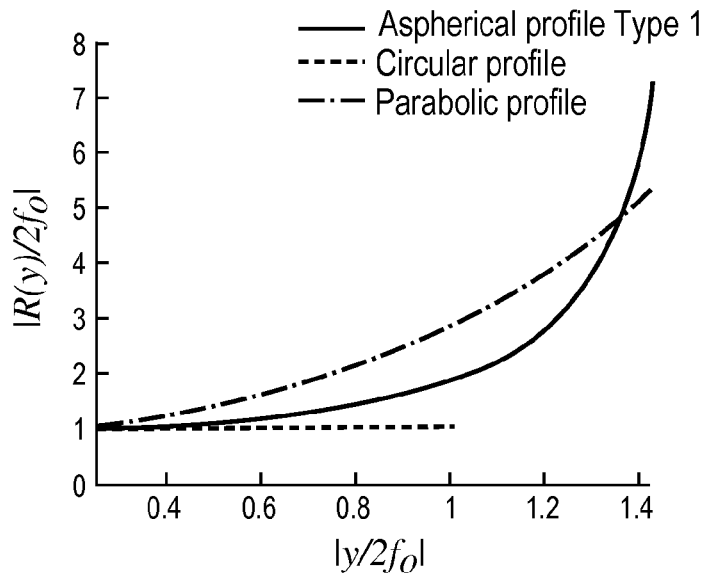

As can be seen in FIG. 3B, the local radius of curvature of the Type 1 aspherical surface has the following properties:
(1) The radius of curvature is smallest at the vertex of the surface and increases monotonically away from the vertex;
(2) The radius of curvature increases gradually with $|y|$ from the vertex to about $|y| \sim 2f_o$;
(3) The radius of curvature increases rapidly with $|y|$ starting from $|y| \sim 1.3 * 2f_o$;
(4) The radius of curvature has a knee around $|y| \sim 1.2 * 2f_o$; and
(5) Far from the vertex (above $|y| \sim 1.4 * 2f_o$), the radius of curvature can reach up to 10 times the initially value at the vertex.

Figure 3C:
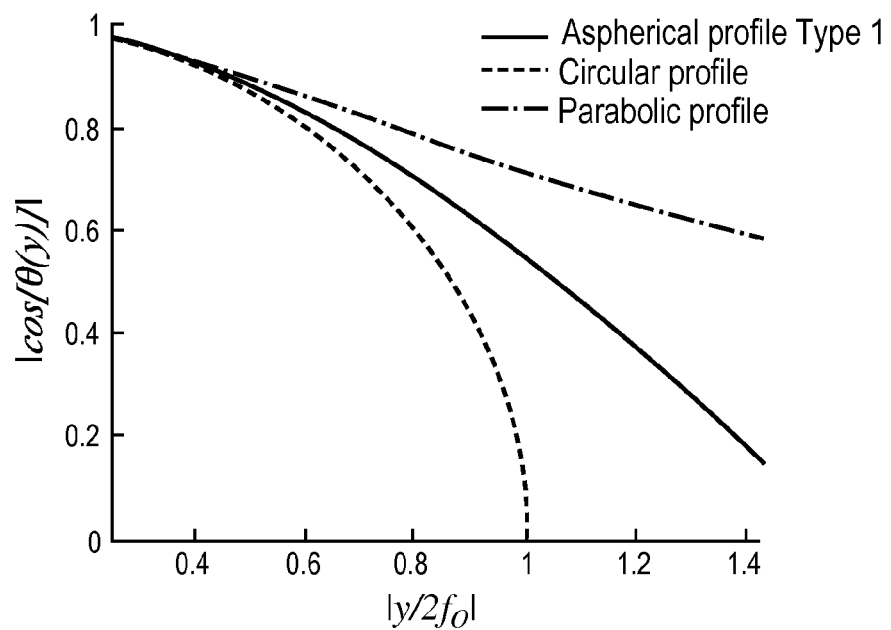
Figure 3D:
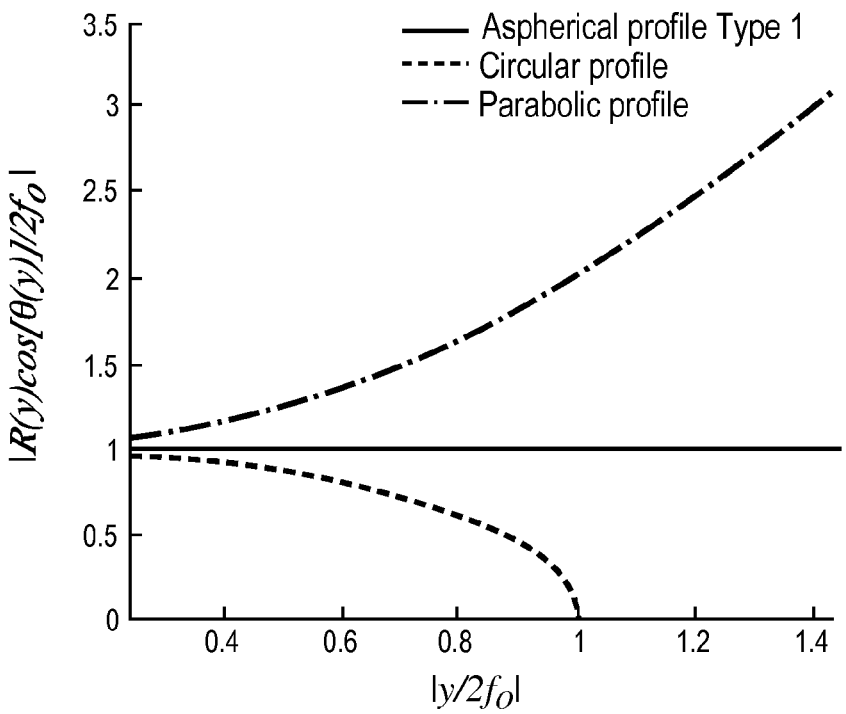
Figure 3E:
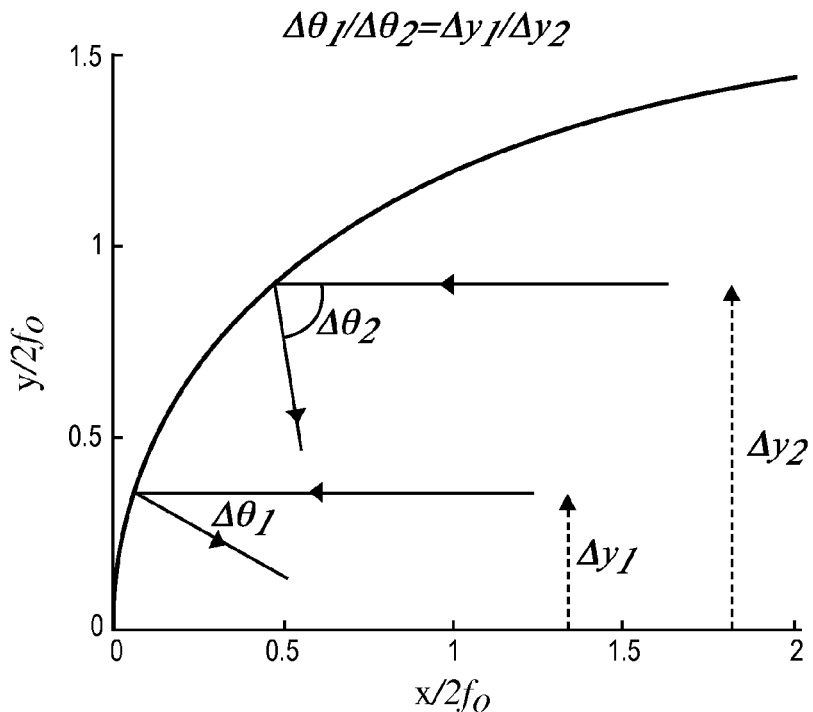
Figure 3F:
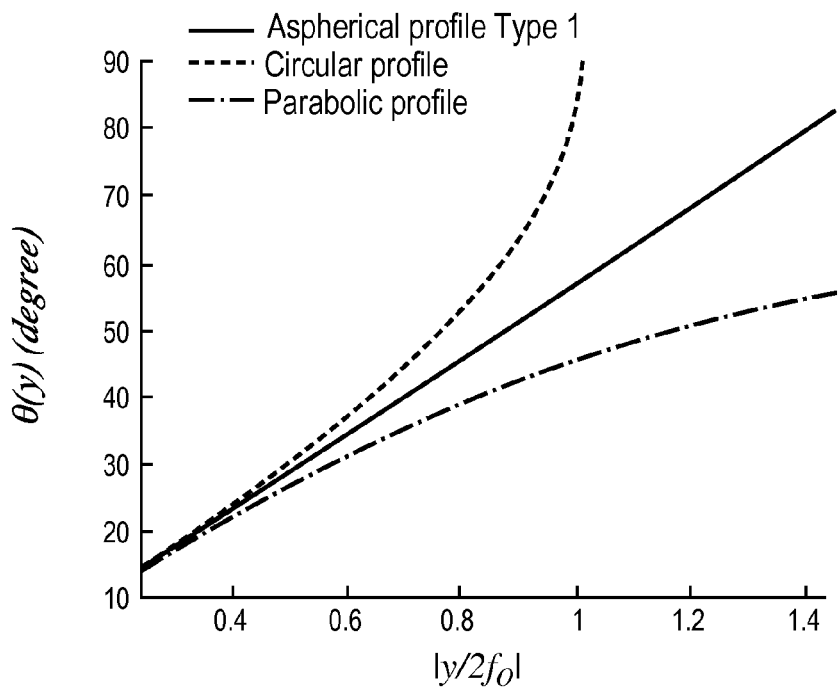

As shown in FIG. 3C, the cosine of the incidence angle decreases gradually with $|Y|$ and reaches down to 0.1 far from the vertex (above $|y| \sim 1.4 * 2f_o$), such that multiplying the radius of curvature by the cosine of the incidence angle remains substantially constant at any portion or point of the surface and equal to $2f_o$, as shown in FIG. 3D. This nearly constant behavior is a distinct feature of the Type 1 profile. In addition, as shown in FIGS. 3E and 3F, the incidence angle, and thus the reflection or refraction angle, varies linearly with the vertical displacement of the incident beam with respect to the horizontal axis (i.e. $\Delta\theta$=constant $\Delta y$).

Features of the Type 1 profile, related to its local radius of curvature as well as its slope, as described above, provide various optical beam steering properties. For example, the scanning angle can linearly vary with the displacement of the optical element, which simplifies the scanning mechanics and electronics. In addition, since the light undergoes the same transformation for various incidence angles, the output beam spot size is substantially uniform across the scanning angles. Such uniformity can be achieved in both 1-D and 2-D scanning systems, as described in more detail below.

Aspherical Surface Profile Type 2

Figure 4A:
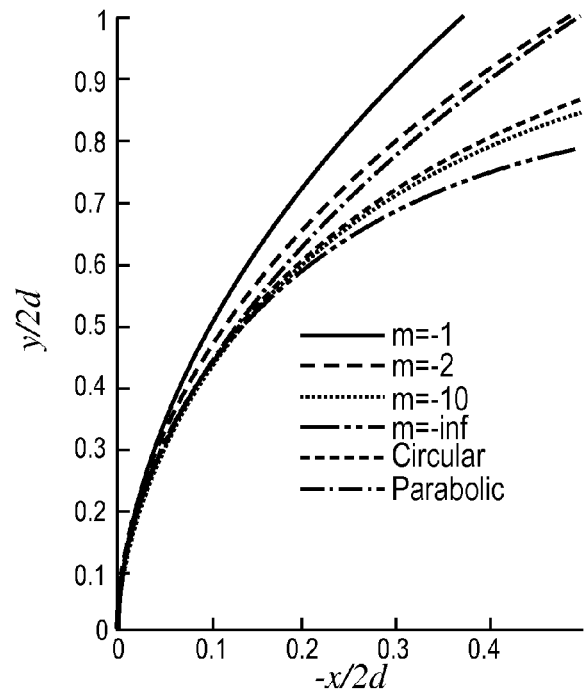
FIGS. 4A-4E illustrate another exemplary surface profile of an aspherical optical element, in accordance with embodiments of the present invention.

FIGS. 4A-4D illustrate various features of a second aspherical surface profile (Type 2). The in-plane cross section of the aspherical surface profile Type 2 follows the second order non-linear differential equation:

$$2\left(\frac{y}{m} + d - x\right)y'' + y'^3 + y' = 0 \quad \text{(Equation 5)}$$

where d is a parameter controlling the focal length of the optical surface and m is another parameter that enables Equation 5 to represent a family of profiles. Although Equation 5 has no analytical solution, Equation 5 can be solved numerically and tabulated for different values of the parameters d and m. By normalizing the dimensions with respect to d, tabulation is only needed versus m, which is depicted in FIG. 4A, where a comparison between the in-plane cross section of various Type 2 surfaces and the conventional circular as well as the parabolic cross section profiles is given.

Figure 4B:
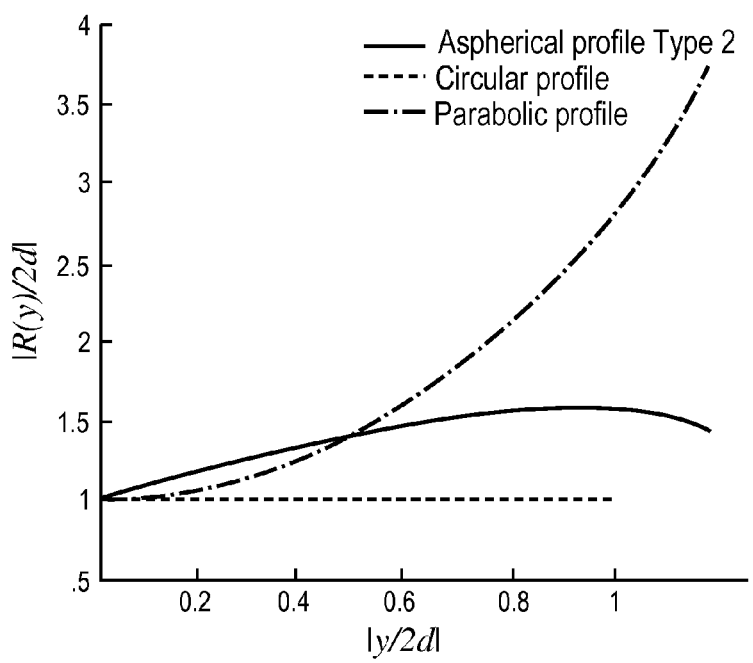

When m is close to −2, the local radius of curvature of the Type 2 aspherical surface has the following properties, as seen in FIG. 4B:
 (1) The local radius of curvature has its smallest value of 2d at the vertex of the surface;
 (2) The local radius of curvature increases going away from the vertex up to $|y|{\sim}0.95*2d$;
 (3) The local radius of curvature reaches a maximum value of ${\sim}1.6*2d$; and
 (4) The local radius of curvature decreases again down to ${\sim}1.4*2d$.

Figure 4C:
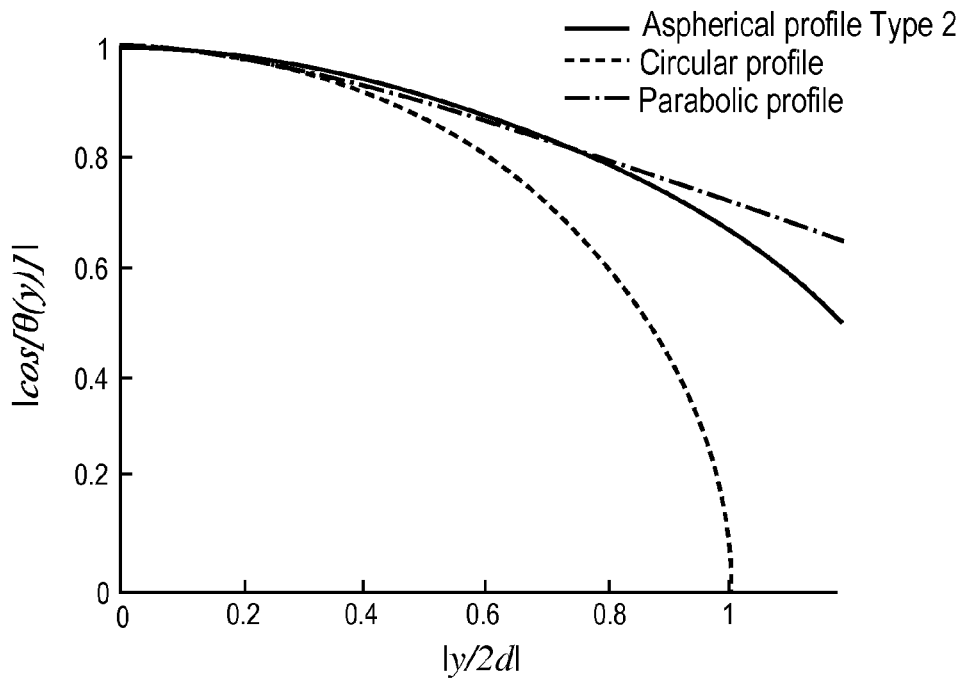
Figure 4D:
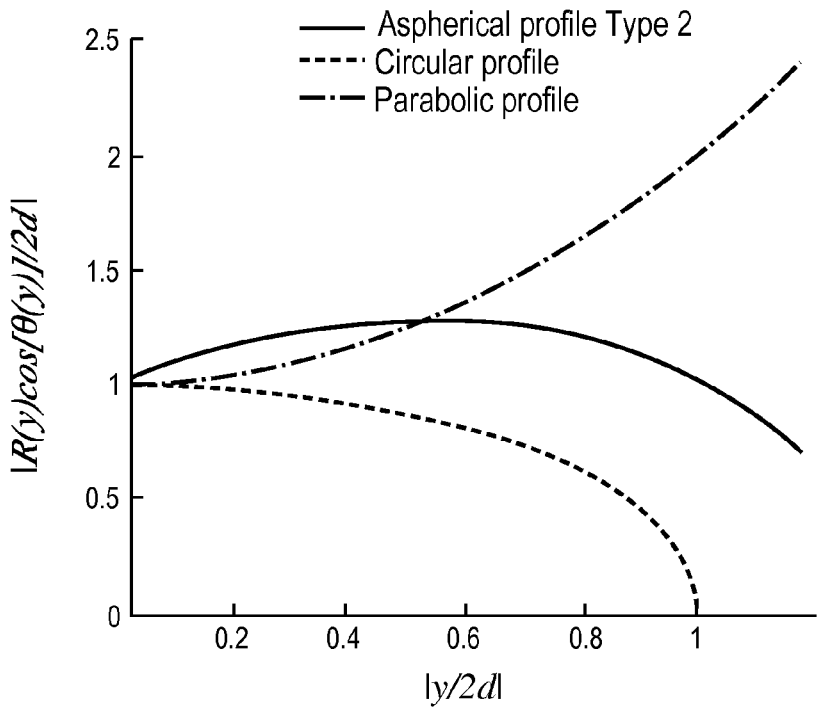
Figure 4E:
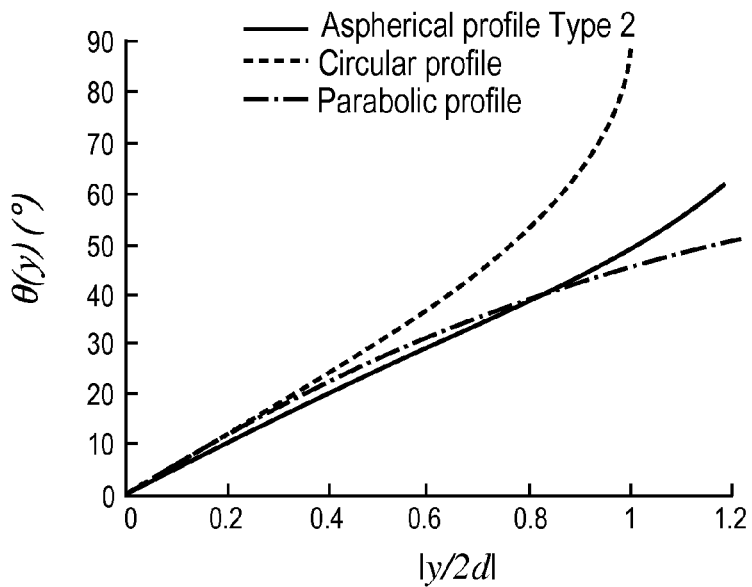

As can be seen in FIG. 4C, the cosine of the incidence angle decreases gradually with $|y|$ and reaches down to 0.5 far from the vertex such that multiplication of the radius of curvature by the cosine of the incidence angle is allowed to slightly vary around a nominal value for different incidence angle. The variation is around $R\cos(\theta)=2d$ with a variation of ${\sim}30\%$, as shown in FIG. 4D. The incidence angle, as shown in 4E, has close to linear behavior with the vertical displacement and reaches up to 60° while still satisfying the conditions in Equations 1 and 2.

Optical beam steering properties provided by the aspherical surface profile Type 2 include displacements comparable and up to twice their focal length and increased scanning angles, up to 170°, with high performance regarding the scanned beam spot size and beam collimation.

Aspherical Surface Profile Type 3

FIGS. 5A-5F illustrate various features of a third aspherical surface profile (Type 3). The cross section of the aspherical surface profile Type 3 follows the second order non-linear differential equation:

$$2f_o y'' y' - [1+y'^2]^2 = 0 \quad \text{(Equation 6)}$$

Equation (6) has an exact analytical solution in the form of two components summed together: 1) an arctan function with its argument in the form of the division of two square root functions; and 2) a multiplication of the same two square root functions:

$$y = -f_o \tan^{-1}\left(\frac{\sqrt{x-x_v}}{\sqrt{f_o - (x-x_v)}}\right) - \sqrt{f_o - (x-x_v)}\sqrt{x-x_v} + y_v \quad \text{(Equation 7)}$$

where $(x_v, y_v)$ is the vertex coordinate of the curved surface and $f_o$ is a parameter controlling the focal length of the optical surface. A comparison between the in-plane cross section Type 3 surface profile and the conventional circular as well as the parabolic cross section profiles is shown in FIG. 5A when $(x_v, y_v) = (0,0)$ for simplicity.

As can be seen in FIG. 5B, the local radius of curvature of the Type 3 surface has the following properties:
 (1) The local radius of curvature has its largest value at the vertex of the surface and decreases monotonically away from the vertex;
 (2) The local radius of curvature decreases gradually with $|y|$ from the vertex to about $|y|{\sim}0.74*2f_o$ where it reaches half its initial value; and
 (3) The local radius of curvature decreases aggressively after that until it reaches zero value at $|y|{\sim}0.786*2f_o$.

As can be seen in FIG. 5C, the reciprocal of the cosine of the incidence angle increases slowly with $|y|$ and reaches down to 2 at $|y|{\sim}0.74*2f_o$. An aggressive increase then takes place such that the reciprocal of the cosine of the incidence angle increases to 10 times its initial value at $|y|{\sim}0.785*2f_o$ and up to infinity at $|y|{\sim}0.786*2f_o$. The multiplication of the radius of curvature by the reciprocal of the cosine of the incidence remains constant at any portion or point of the surface and equal to $2f_o$, as shown in FIG. 5D. This nearly constant behavior is a distinct feature of the Type 3 profile.

In addition, as seen in FIG. 5E, the sensitivity of the reflection or refraction angle with respect to the vertical displacement is much larger than the conventional circular and parabolic profiles, especially for incidence angles larger than 60° (close to the top of the profile), as shown in FIG. 5F, such that a small change in the vertical displacement causes a large change in the deflection angle of the optical ray ($\Delta\theta/\Delta y \to \infty$).

With the Type 3 surface profile, the scanning angle is sensitive to the displacement relative to the conventional cylindrical or spherical surfaces. This optical beam steering property provides benefits when targeting a displacement sensor or in optical switching, for instance.

Aspherical Surface Profile Type 4

FIG. 6 illustrates a fourth aspherical surface profile (Type 4). The Type 4 aspherical surface profile is a three-dimensional surface profile that can be described by the following equation:

$$(z-zc)^2 + (x-xc(y))^2 = R^2(y) \quad \text{(Equation 8)}$$

where xc, zc are the coordinates of the center of curvature of the surface cross section in the xz plane (out-of-plane direction) and the R is the radius of curvature of the cross section. The surface cross section is varying with y, such that the center as well as radius of curvature changes according to the in-plane profile.

The in-plane profile (in the xy plane) can be, for example, a spherical/cylindrical surface or one of the aspherical surface types presented above (i.e., Type 1, Type 2 or Type 3). In the example shown in FIG. 6, the in-plane profile 610 follows Type 1 or Type 2.

The in-plane profile equation determines how xc(y) changes versus y. The out-of-plane radius of curvature is also linked to the y coordinate, such that the radius of curvature becomes smaller going away from the vertex of the surface, as can be seen in FIG. 6. The out-of-plane radius of curvature has a y-dependence given by the same dependence of the cosine of the incidence angle of the in-plane profile. For example, three points 620-640 are shown in FIG. 6, each having an out-of-plane radius of curvature dependent on the cosine of the incidence angle $\theta_1$, $\theta_2$ and $\theta_3$.

Therefore, for any portion of the surface 125, a cross section can be taken in-plane (in the xy plane) or out-of-plane (in the xz plane) and two radii of curvatures can be defined, $R_i R_{in\text{-}plane}$ and $R_o R_{out\text{-}of\text{-}plane}$ respectively. These radii of curvatures are related to the incidence angle of the beam, such that for an in-plane profile following Type 1, the aspherical surface satisfies the following equality for an incident beam that is parallel to the x-axis:

$$R_o = \text{const}_1 \cos(\theta) \tag{Equation 9}$$

$$R_i \cos(\theta) = \text{const}_2 \tag{Equation 10}$$

When using Type 1 as the aspherical cross section in-plane profile, the constants $\text{const}_1$ and $\text{const}_2$ can be equal to each other, and in this case:

$$R_o/\cos(\theta) = R_i \cos(\theta) = R \tag{Equation 11}$$

When using Type 2 as the aspherical cross section in-plane profile or any other profile, the right hand sides of Equations 9 and 10 are not constant and may be allowed to vary up to approximately 20%.

It should be noted that fitting any of the surfaces presented (Type 1 to 4) with a polynomial may not produce the same performance given from the exact equations presented. This is due to the fact that the surface profile contains information not only about the vertical coordinates versus the horizontal coordinates, but also information about the slope and the radius of curvature of the profile for each small portion of the curve. Such information is difficult to maintain accurate even with high order polynomials due to the small oscillation of the polynomial around the exact values.

Figure 7:
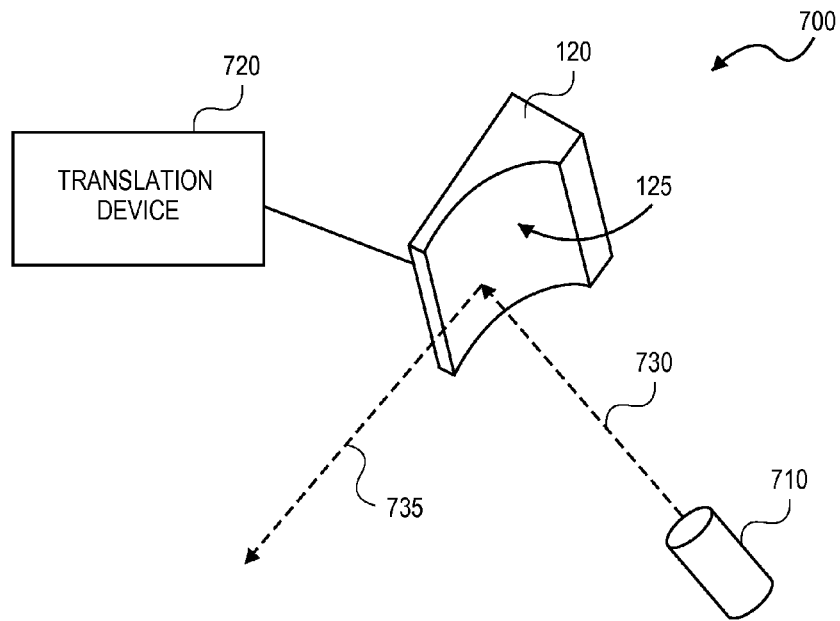
FIG. 7 illustrates another exemplary optical system including a moveable aspherical optical element, in accordance with embodiments of the present invention.

FIG. 7 illustrates an optical system 700 including a moveable aspherical optical element 120. In an exemplary embodiment, the aspherical optical element 120 has a surface 125 with a profile following one of the four aspherical surface types (Types 1-4) presented above. In FIG. 7, the surface 125 is a concave reflecting surface optically coupled to receive an incident beam 730 emitted from an optical source 710 and reflect the incident beam 730 off the surface 125 to produce a reflected (or output) beam 735. However, it should be understood that in other embodiments, a convex surface and/or refracting surface may be used. The optical source 710 may be, for example, a laser source, a collimated LED, an optical fiber, or any other type of optical source. The optical source 710 may produce visible, Infra Red (IR), Ultra Violet (UV), X-ray or Microwave radiation.

The optical system 700 further includes a translation device 720 coupled to the aspherical optical element 120 to cause a displacement of the aspherical optical element 120. The translation device 720 may be, for example, a Micro Electro-Mechanical Systems (MEMS) actuator. In an exemplary embodiment, the MEMS actuator may be an electro-static actuator, such as a comb drive actuator, parallel plate actuator or other type of actuator.

In an exemplary operation, motion of the translation device 720 causes a displacement in the position of the moveable aspherical optical element 120. The translation device 720 may have one or more degrees of freedom of motion to produce a desired displacement of the aspherical optical element 120 in one or more directions. Such motion may be used to provide optical beam steering and/or optical beam shaping in, for example, one or more optical scanning configuration (i.e., objective, pre-objective or post-objective).

Figure 8:
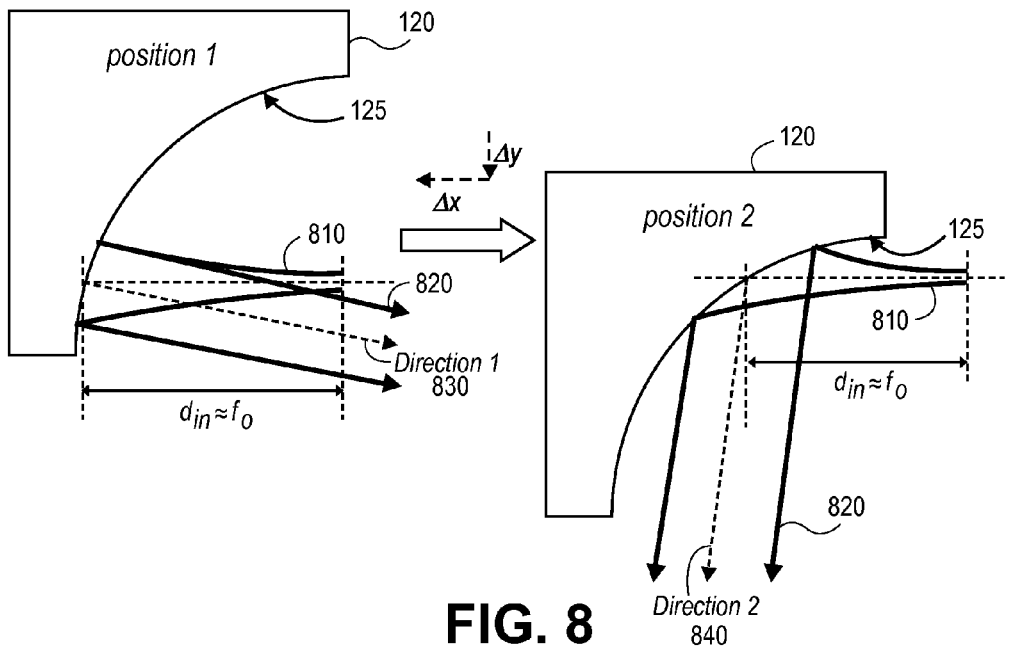
FIG. 8 illustrates an exemplary optical system providing beam collimation and angular deflection using a moveable aspherical optical element, in accordance with embodiments of the present invention.

For example, referring now to FIG. 8, the moveable aspherical optical element 120 may be utilized to steer an incident beam 810 (i.e., cause an angular deflection of the incident beam off the surface 125), while maintaining beam collimation of the reflected beam 820 across the scanning angles. The aspherical optical element 120 in FIG. 8 is shown moveable between a first position (position 1) and a second position (position 2), using, for example, the translation device shown in FIG. 7.

In position 1, the moveable aspherical optical element 120 is used to collimate an incident beam 810 that originated from (or has its minimum beam waist at) a location that is separated from the optical element 120 by its focal length. It should be noted that the in-plane focal length is given by half the radius of curvature multiplied by the cosine of the incidence angle. Thus, in position 1, the reflected beam 820 is deflected off the surface 125 and collimated in a first direction 830 (denoted Direction 1).

The aspherical optical element 120 can then be moved in two directions (x and y), $\Delta x$ and $\Delta y$ respectively, to position 2, such that when the aspherical optical element 120 is in position 2, the incident beam 810 is still originating from (or has its minimum beam waist at) a location that is separated from the optical element 120 by its focal length. Thus, in position 2, the reflected beam 820 is deflected off the surface in a second direction 840 (denoted Direction 2), while still maintaining collimation of the reflected beam 820.

In an exemplary embodiment, two different translation mechanisms can be applied to maintain the beam collimated with the same efficiency when used with a concave surface of Type 1 or Type 2. Referring now to FIGS. 9A-9D, the first mechanism involves attaching the aspherical optical element 120 to a 2-D translation device (such as the translation device shown in FIG. 7), in which the x-y motion is restricted to follow a curved translation path. In order to maintain a fixed distance d between the beam waist (near the optical source 710) and the incidence point on the surface of the aspherical optical element 120, the translation path is substantially identical to the in-plane cross section surface profile. For example, when using a Type 1 surface, the overall translation path of the translation device can be described by Equation 4.

Figures 9A, 9B, 9C, 9D:
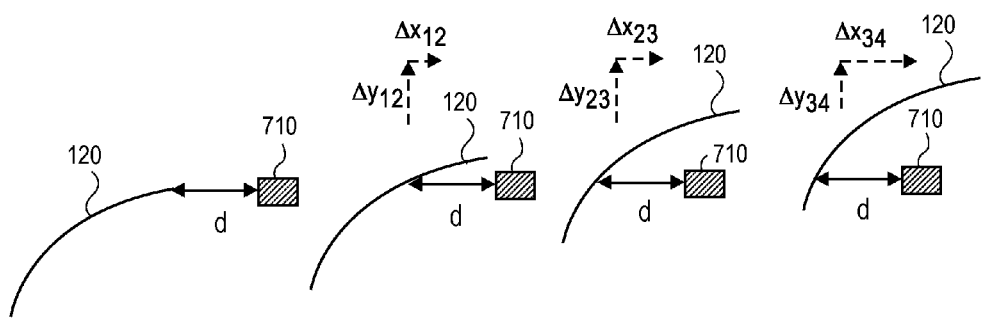
FIGS. 9A-9D illustrate an exemplary translation path of the moveable aspherical optical element to produce beam collimation and angular deflection, in accordance with embodiments of the present invention.
Figures 10A, 10B, 10C, 10D:
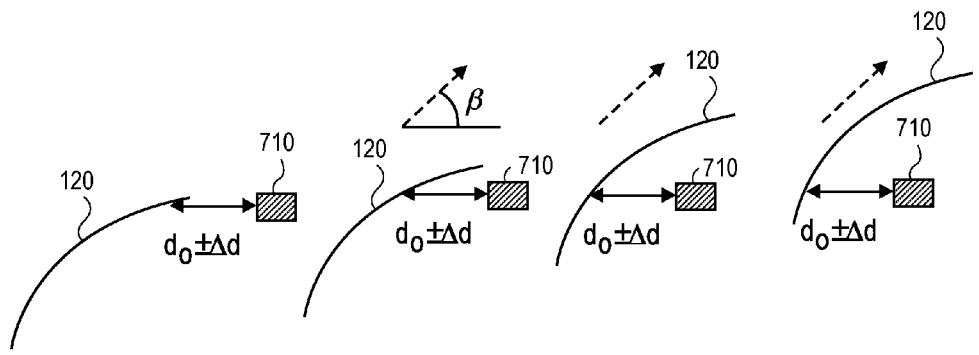
FIGS. 10A-10D illustrates another exemplary translation path of the moveable aspherical optical element to produce beam collimation and angular deflection, in accordance with embodiments of the present invention.

Thus, as can be seen in FIGS. 9A and 9B, moving the aspherical optical element 120 from the position shown in FIG. 9A to the position shown in FIG. 9B involves a small x-shift ($\Delta x_{12}$) with respect to the y-shift. ($\Delta y_{12}$) Then, as can be seen in FIGS. 9B and 9C, moving the aspherical optical element 120 from the position shown in FIG. 9B to the position shown in FIG. 9C involves comparable x- and y-shifts ($\Delta x_{23}$, $\Delta y_{23}$). Finally, as can be seen in FIGS. 9C and 9D, moving the aspherical optical element 120 from the position shown in FIG. 9C to the position shown in FIG. 9D involves a large x-shift ($\Delta x_{34}$) with respect to the y-shift ($\Delta y_{34}$). In each of the positions, the optical distance between the optical source 710 (or the incident beam waist) and the surface of the aspherical optical element 120 is kept substantially constant, thereby maintaining the collimation efficiency of the optical beam.

Referring now to FIGS. 10A-10D, the second translation mechanism uses a 1-D linear translation device that has its translation axis tilted an angle $\beta$ with respect to the optical beam axis. The tilt angle $\beta$ may be, for example, equal to or close to 63.5° when used with a Type 2 surface profile with m equal to −2. In one embodiment, the optical distance between the optical source 710 (or the incident beam minimum waist) and the surface of the aspherical optical element 120 may vary between 10-20% around the nominal value of perfect collimation ($d_o$). Thus, the optical distance is shown in each of FIGS. 10A-10D as $d_o \pm \Delta d$. In this embodiment, the output beam is substantially collimated with slight variations in the collimation efficiency.

Figure 11:
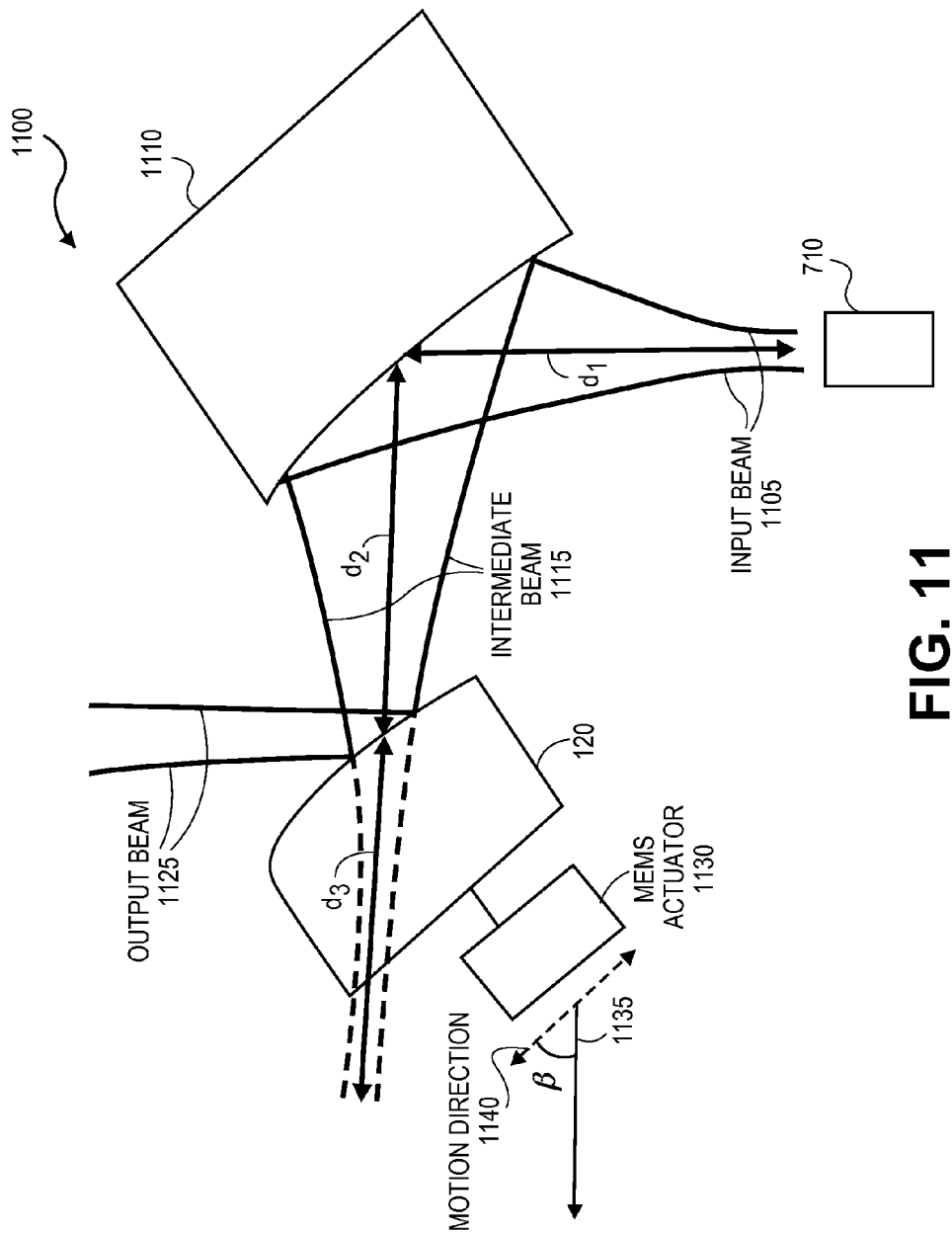
FIG. 11 illustrates another exemplary optical system providing beam collimation and angular deflection using a moveable aspherical optical element, in accordance with embodiments of the present invention.

In another embodiment, as shown in FIG. 11, beam collimation and angular deflection can also be achieved using a movable aspherical convex optical element 120, instead of a concave optical element. In the optical system 1100 shown in FIG. 11, a fixed concave optical element 1110 is also used to condition the optical beam for collimation by the convex optical element. The aspherical convex optical element 120 may be moveable in one of the two translation mechanisms discussed above with respect to FIGS. 9 and 10.

As shown in FIG. 11, the input beam 1105 emitted from the optical source 710 can be a diverging or a converging optical beam, while an intermediate beam 1115 reflected from the surface of the fixed concave optical element toward the convex optical element 120 can be a converging beam that has its focal point behind the convex optical element. In one embodiment, the distance $d_3$ between the intermediate beam focal point (minimum beam waist) and the surface of the convex optical element 120 at the incidence plane is kept close to the focal length of the convex optical element ($f_{conv}$). In addition, the distances $d_1$ (between the optical source 710 and the surface of the fixed concave optical element 1110) and $d_2$ (between the surfaces of the fixed concave optical element 1110 and the moveable aspherical optical reflecting element 120) may be set to maximize the collimation efficiency of output beam 1125.

For example, in one embodiment, the distance $d_2$ for which the output beam collimation efficiency is maximized for a given distance $d_1$ is given by:

$$d_2 = f_{conc} + f_{conv} + (1 \text{ or zero}) x2 \frac{f_{conc}^2(d_1 - f_{conc})}{(d_1 - f_{conc})^2 + z_{R-in}^2} \quad \text{(Equation 12)}$$

where $z_R$ is the beam Rayleigh range when using a Gaussian beam. The third term can be set to zero to make the distance $d_2$ independent of $d_1$ as well as $z_R$. In this case, $d_2$ is equal to the summation of the concave and the convex optical element focal lengths ($f_{conc}$ and $f_{conv}$) which are opposite in sign. Thus, the output beam collimation efficiency is given by the ratio of the focal lengths of the convex to the concave optical elements.

In another embodiment, the output beam collimation efficiency is maximized for a given distance $d_2$ by setting:

$$d_1 = f_{conc} + \frac{f_{conc}^2}{d_2 - f_{conc} - f_{conv}} \quad \text{(Equation 13)}$$

In this embodiment, the output beam collimation efficiency is controlled by the focal lengths as well as the distance $d_2$ and given by:

$$\frac{w_{out}}{w_{in}} = \frac{\lambda\sqrt{|f_{conc}f_{conv}|}}{\pi w_{in}^2(d_2 - f_{conc} - f_{conv})} \quad \text{(Equation 14)}$$

where $w_{in}$ is the minimum beam waist of the input beam 1105 and $w_{out}$ is the minimum beam waist of the output beam 1125.

Figure 12:
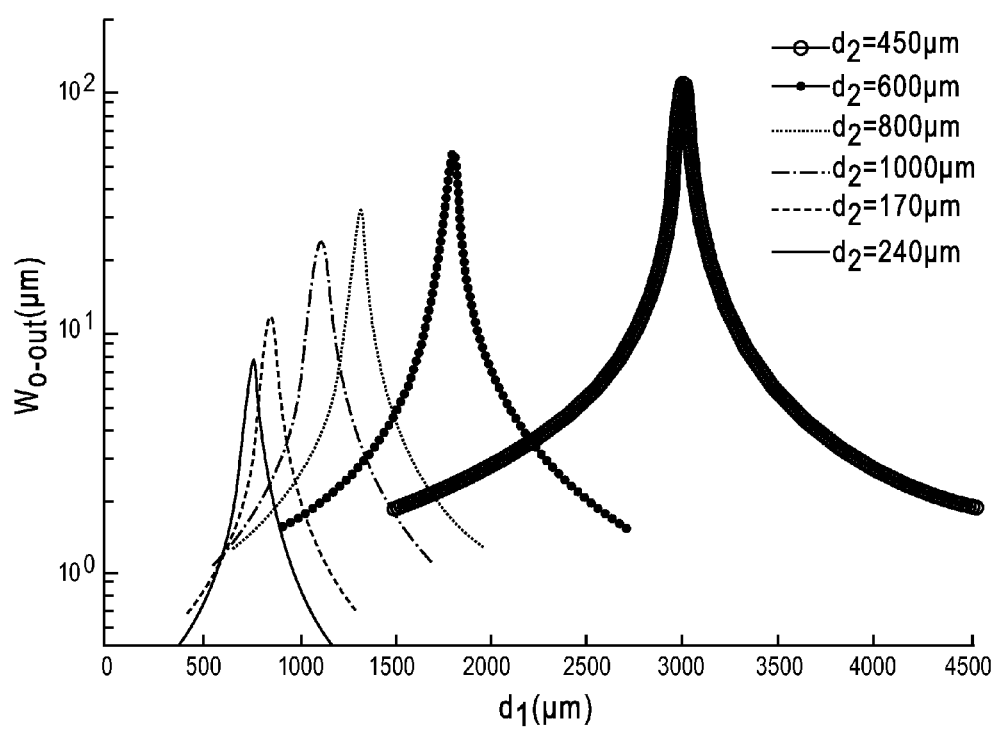
FIG. 12 illustrates exemplary output beam waists produced from the optical system shown in FIG. 11, in accordance with embodiments of the present invention.

For example, if the incidence angle on both optical elements 120 and 1110 is 45°, the focal distances of the concave and convex optical elements are $f_{conc}=600/\sqrt{2}$ μm and $f_{conv}=-300/\sqrt{2}$ μm, respectively. If the input beam 1105 is a Gaussian beam with a minimum beam waist $w_{in}=2.25$ μm, and the wavelength λ=633 nm, the output beam waist is depicted as shown in FIG. 12 for the cases of $d_2$=450, 600, 800, 1000, 1700 and 2400 μm. The collimation efficiency has a maximum for the $d_1$ values given by Equation 13, and increases with reducing $d_2$ towards the sum of the focal lengths of the concave and the convex optical elements. It should be noted that the best collimation efficiency shown in FIG. 12 corresponds to the largest output beam waist.

FIGS. 8-11 illustrate various exemplary embodiments for producing in-plane beam collimation and angular deflection. To collimate the beam in the out-of-plane direction, in one embodiment, an aspherical surface of Type 4 may be used.

Figure 13:
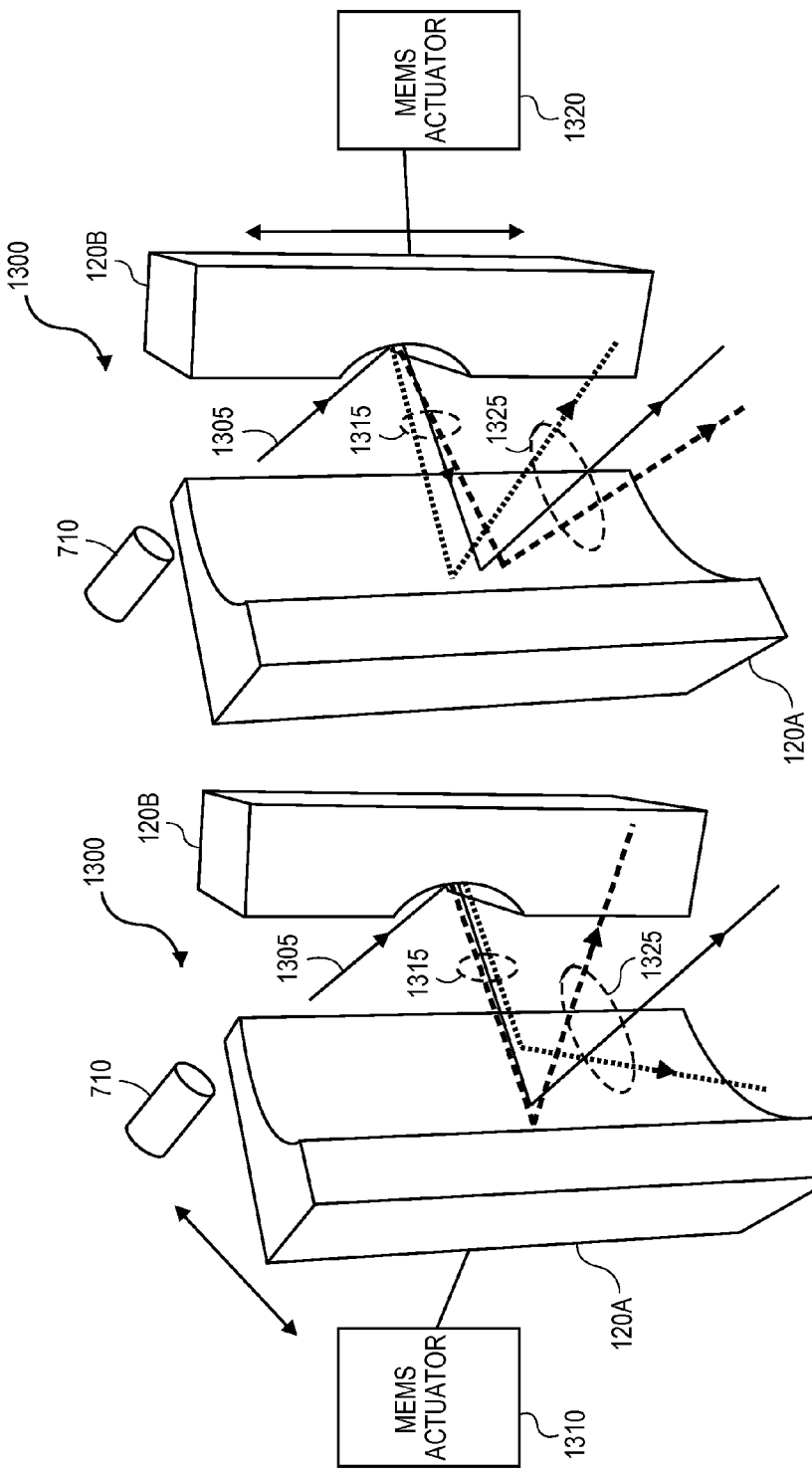
FIGS. 13A and 13B illustrate yet another exemplary optical system providing beam collimation and angular deflection using moveable aspherical optical elements, in accordance with embodiments of the present invention.

In another embodiment, as shown in FIGS. 13A and 13B, out-of-plane beam collimation, together with angular deflection may be produced using two aspherical optical elements 120A and 120B. One of the aspherical optical elements 120B has its surface profile in the out-of-plane direction, while the other aspherical optical element 120A has its surface profile in the in-plane direction.

The in-plane aspherical optical element 120A is attached to an in-plane MEMS actuator 1310 that provides 1- or 2-D translational motion, as discussed above. In addition, the out-of-plane aspherical optical element 120B is attached to an out-of-plane MEMS actuator 1320 that provides 1- or 2-D translational motion, as discussed previously. The in-plane beam angular deflection is achieved by moving the in-plane aspherical optical element 120A and the out-of-plane beam angular deflection is achieved by moving the out-of-plane aspherical optical element 120B. For example, as shown in FIG. 13B, an input beam 1305 emitted from an optical source 710 is angularly deflected in the out-of-plane direction to produce intermediate beam 1315. As shown in FIG. 13A, the intermediate beam 1315 is then angularly deflected in the in-plane direction to produce output beam 1325.

Figure 14:
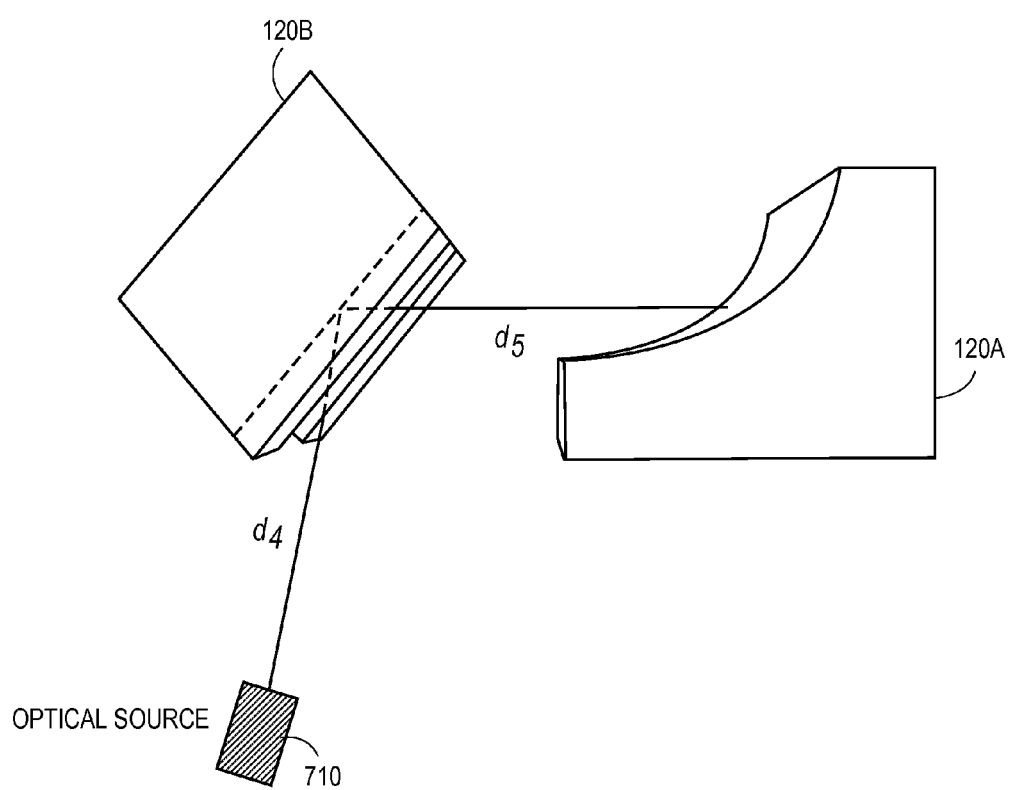
FIG. 14 illustrates exemplary distances between the aspherical optical elements of the optical system shown in FIGS. 13A and 13B, in accordance with embodiments of the present invention.

Beam collimation in the optical system 1300 shown in FIGS. 13A and 13B is achieved by controlling the distance between the optical source 710 and the out-of-plane aspherical optical element 120B, and controlling the distance between the out-of-plane aspherical optical element 120B and the in-plane aspherical optical element 120A. For example, as shown in FIG. 14, the surface of the out-of-plane aspherical optical element 120B is separated from the optical source 710 (or the beam waist) by a distance $d_4$, while the surface of the in-plane aspherical optical element 120A is separated from the optical source 710 (or the beam waist) by a distance $d_4+d_5$. The collimation function is achieved by setting $d_4$ equal to the focal length of the out-of-plane aspherical optical element 120B, while setting $d_4+d_5$ equal to the focal length of the in-plane aspherical optical element 120A.

In addition to angular deflection steering of the beam, the aspherical optical elements shown in FIGS. 13A, 13B and 14 may be utilized to perform linear scanning by displacing the aspherical optical elements 120A and 120B together Thus, the optical system 1300 may form a portion of a raster optical beam scanner. In another embodiment, a moveable flat mirror (not shown) may be added to the in-plane and out-of-plane aspherical optical elements to produce a raster optical beam scanner.

Referring now to FIGS. 15A-15J, an optical system 1500 is shown that provides both angular deflection and beam focusing/defocusing (beam shaping). The optical system 1500 includes the in-plane aspherical optical element 120A, the out-of-plane aspherical optical element 120B and a flat optical element 1510. The flat optical element 1510 is optically coupled to receive the input (or incident) beam 1505 from the optical source 710 and is configured to reflect the input beam 1505 towards the out-of-plane aspherical optical element 120B as a first intermediate beam 1515. The out-of-plane aspherical optical element 120B is optically coupled to receive the first intermediate beam 1515 and is configured to reflect the first intermediate beam 1515 towards the in-plane aspherical optical element 120A as a second intermediate beam 1525. The in-plane aspherical optical element 120A is optically coupled to receive the second intermediate beam 1525 and is configured to reflect the second intermediate beam 1525 as an output beam 1535 that has a desired beam shape (or spot size) 1545 in both the in-plane and out-of-plane directions.

As can be seen in FIG. 15A, the surface of the flat optical element 1510 is separated from the optical source 710 (or the beam waist) by a distance $d_6$, the surface of the out-of-plane aspherical optical element 120B is separated from the optical source 710 (or the beam waist) by a distance $d_4+d_6$, and the surface of the in-plane aspherical optical element 120A is separated from the optical source 710 (or the beam waist) by a distance $d_4+d_5+d_6$. An output beam 1535 with minimum spot size 1545 is achieved by setting $d_4+d_6$ equal to the focal length $f_o$ of the out-of-plane aspherical optical element 120B, while setting $d_4+d_5+d_6$ equal to the focal length $f_i$ of the in-plane aspherical optical element 120A.

The output beam 1535 can be focused in both planes (in-plane and out-of-plane) by controlling the distance from the optical source 710 to each of the optical elements 1510, 120A and 120B. Thus, each of the optical elements 1510, 120B and 120A is coupled to a respective MEMS actuator 1520, 1530 and 1540 to cause a respective displacement of each of the optical elements 1510, 120B and 120A. In an exemplary embodiment, by displacing each of the optical elements 1510, 120B and 120A by a distance $\Delta x_1$, as shown in FIG. 15B, the distance from the optical source 710 (or beam waist) to the in-plane aspherical optical element 120A is kept the same, while the distance from the optical source 710 (or beam waist) to the out-of-plane aspherical optical element 120B is changed (since the distance between the flat optical element 1510 and the optical source has changed to $d_{6-1}$), thus resulting in an output beam 1535 with a spot size 1545 focused in the scanned area in the in-plane direction while covering a larger (defocused) area in the out-of-plane direction.

In FIG. 15C, additional defocusing in the out-of-plane direction is achieved by moving each of the optical elements 1510, 120A and 120B by a larger distance $\Delta x_2$, thus resulting in a larger distance between the optical source 710 (or beam waist) and the out-of-plane aspherical optical element 120B (as a result of the larger distance $d_{62}$ between the flat optical element 1510 and the optical source 710). In the embodiment shown in FIG. 15C, the central line of the output beam spot size 1545 can be achieved by defocusing the beam step-by-step in the out-of-plane direction.

For a given focusing or defocusing in the out-of-plane direction, scanning in the in-plane direction can be achieved, as shown in FIGS. 15D-15F. As can be seen in FIGS. 15E and 15F, the distance to the out-of-plane aspherical optical element 120B is kept constant (the distance between the flat optical element 1510 and the optical source 710 is kept at $d_{6-1}$) to achieve the desired defocusing in the out-of-plane direction, while the distance to the in-plane aspherical optical element 120A changes to achieve the desired defocusing in the in-plane direction. For example, as shown in FIG. 15E, the in-plane aspherical optical element 12A is moved a distance $\Delta x_a$, thus resulting in a smaller distance $d_{5-1}$ between the out-of-plane optical element 120B and the in-plane optical element 120A. Then, as shown in FIG. 15F, the in-plane aspherical optical element 12A is moved a further distance $\Delta x_4$, thus resulting in a smaller distance $d_{5-2}$ (as compared to FIG. 15E) between the out-of-plane optical element 120B and the in-plane optical element 120A.

In another embodiment, the flat mirror can be removed if the out-of-plane aspherical optical element 120B is displaced independently in a tilted direction with respect to the motion of the in-plane aspherical optical element 120A, such that the angle of incidence of the incident beam is kept constant. In this embodiment, no angular deflection for the beam takes place. Instead, a modulation of the range of space illuminated by the beam is achieved. In addition, dynamic beam shaping may be achieved by controlling the beam shape in two orthogonal directions independently.

As shown in FIG. 15G, the optical system 1500 can function as a 2-D optical scanner system in which the output beam 1535 is directed towards a sample under test 1550, and the resulting reflected/scattered light 1555 from the sample under test 1550 is detected by a detector 1560. The output from the detector 1560 can be input to a signal processor 1570 to create a 2-D image of the sample under test 1550. By scanning the sample under test 1550 incrementally, as shown in FIGS. 15A-15C, and applying a difference (or differentiation) process by the signal processor 1570 to deduce or estimate the incremental (non-scanned) areas, a 2-D image of the central part of the sample under test 1550 can be obtained. Applying the incremental scanning process shown in FIGS. 15A-15C step by step in a 2-D scanning manner, as shown in FIGS. 15D-15F for different distances (i.e., $d_{6-1}$, $d_{6-2}$, ... $d_{6-N}$), a complete 2-D image of the sample under test 1550 can be realized. This type of 2-D scanning is referred to herein as "radial scanning".

Referring now to FIGS. 15H-15J, by allowing one or both of the aspherical optical elements 120A and 120B to be displaced, angular deflection of the output beam 1535 can also be achieved. For example, as can be seen in FIGS. 15I and 15J, the defocused beam in the out-of-plane direction is deflected angularly in the in-plane direction using two-degrees of freedom of motion (as shown in FIGS. 9A-9D) to achieve line scanning, instead of point scanning when the beam is focused or collimated in both directions. This feature can be used to produce a "tunable resolution scanner" that may enable the scanning speed to be adapted to the resolution, depending on the target application.

By combining the focusing/defocusing scanning in FIGS. 15A-15F with the discrete angular scanning in FIGS. 15H-15J, a more versatile radial scanning system can be achieved. For example, higher resolutions and scanning of arbitrary non-symmetric objects are both possible using a combined angular focusing/defocusing scanner. Furthermore, this combination can be used in beam shaping, where control of the beam shape as well as its tilt angle are important for beam matching and coupling, for example. In addition to the angular deflection, as well as the radial steering of the beam, linear scanning can be applied by displacing the aspherical optical elements 120A and 120B together or by adding a moving flat mirror.

It should be understood that in all the optical systems described herein, the aspherical optical reflecting element 120 can be replaced by an aspherical optical refracting element (i.e., an aspherical lens), and the same translation techniques and surface profiles can be used to achieve beam collimation and angular deflection and/or focusing/defocusing. Such an aspherical lens can follow one or more of the presented profiles (Types 1-4) on either one side or both sides of the lens.

Figure 16:
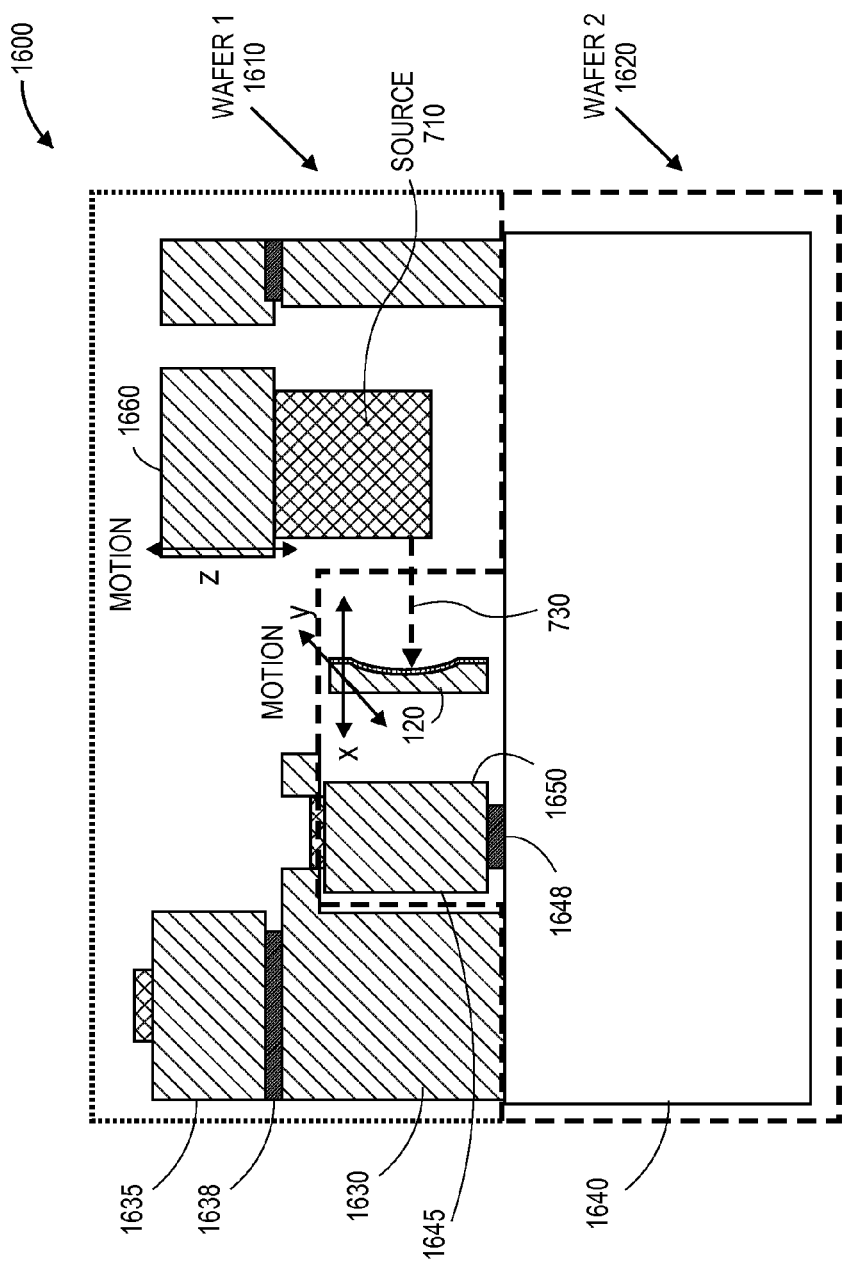
FIG. 16 illustrates an exemplary Micro Electro-Mechanical Systems (MEMS) optical system including a moveable aspherical optical element, in accordance with embodiments of the present invention.

Referring now to FIG. 16, a MEMS optical system 1600 including an aspherical optical element 120 having any of the above surface profiles (Type 1-4) can be fabricated on a substrate or wafer 1620, such as silicon-on-insulator (SOI) wafer or another type of wafer (e.g., plastic, glass, etc.). The wafer 1620 may include, for example, a handle layer 1640, a device layer 1645 and an etch stop or sacrificial (e.g., buried oxide (BOX)) layer 1638. In an exemplary embodiment, the aspherical optical element 120 and MEMS actuator 1650 are formed within the device layer 1645. In addition, as shown in FIG. 16, the aspherical optical element 120 can be fabricated such that the principal axis of the aspherical optical element 120 is parallel to the plane of the wafer 1620 and lies within the wafer 1620. In addition, the MEMS actuator 1650 can be fabricated to cause in-plane displacement of the aspherical optical element 120.

In embodiments in which the optical system includes both in-plane and out-of MEMS actuators 1650 and 1660, respectively, the in-plane MEMS actuator(s) 1650 can be fabricated on one wafer (Wafer 2) 1620 and the out-of-plane MEMS actuator(s) 1660 can be fabricated on another wafer (Wafer 1) 1610, and the two wafers 1610 and 1620 may be bonded together, as shown in FIG. 16. The optical elements with a flat profile, curved in-plane profiles and curved out-of-plane profiles can all be fabricated with the in-plane MEMS actuator 1650 on the same wafer 1620, while the optical source 710 can be integrated on the out-of-plane moving stage (MEMS actuator 1660) of wafer 1610. The out-of-plane moving stage may be used, for example, to achieve out-of-plane alignment between the optical source 710 and the optical elements 120 of wafer 1620 or to achieve out-of-plane beam steering. The in-plane MEMS actuator 1650 of wafer 1620 may also be used to achieve in-plane alignment between the optical source 710 and the optical elements 120, achieve beam focusing/defocusing or achieve beam steering.

The optical source 710 may be formed, for example, in the handle layer 1630 of wafer 1610, while the out-of-plane MEMS actuator 1660 is formed in the device layer 1635 of wafer 1610, which may be separated from the handle layer 1630 by an etch stop layer 1638. Electrodes for the actuators can be included on both wafers 1610 and 1620 to enable the various components (e.g., MEMS actuators 1650, 1660, etc.) to be accessible for electrical connectivity.

It should be understood that other fabrication configurations can be used to create an optical system 1600 with in-plane and out-of-plane actuation. For example, one or more optical elements with out-of-plane actuation can be fabricated on wafer 1610, or the optical source 710 may be integrated on wafer 1620 with the in-plane actuation.

In an exemplary embodiment, the aspherical optical surface profile can be fabricated with accurate control of the surface profile using, for example, deep silicon etching technology (i.e., Deep Reactive Ion Etching (DRIE)). For example, the profile can be drawn on a layout editor with a high accuracy manufacturing grid and minimum feature size. Any differences between the layout-drawn curves and the fabricated curves may be smoothed out in a lithography process used in pattering a DRIE etching mask. In addition, various post-processing procedures performed on the surface profile after etching, such as smoothing and annealing, may improve the overall performance.

The monolithic integration of two or more aspherical surfaces, one with an in-plane profile and another with an out-of-plane profile is also achievable. In this embodiment, two etching masks can be used, one for the out-of-plane curved surfaces and the other for the flat surfaces and in-plane curved surfaces. The out-of-plane curved surface is etched first, and is then protected from the next anisotropic etching by growing a protection layer on the surface that can be removed later. Thus, MEMS actuators (in-plane as well as out-of-plane), flat refraction or reflection surfaces, in-plane aspherical surfaces and out-of-plane aspherical surfaces can all be monolithically integrated on the same wafer.

Figure 17:
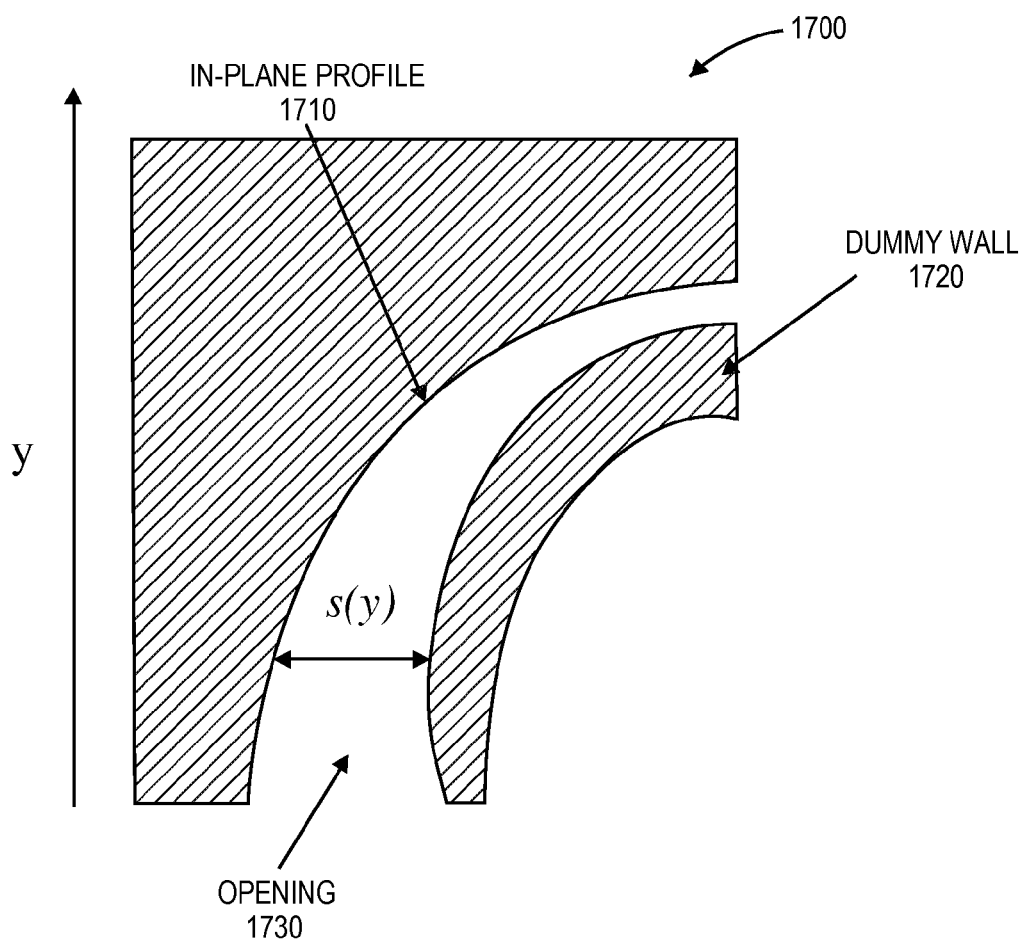
FIG. 17 illustrates an example drawn layout for use in fabricating an aspherical optical element, in accordance with embodiments of the present invention.

Referring now to FIG. 17, an aspherical surface profile of Type 4, as described above, may also be fabricated using a combination of an aspherical in-plane profile 1710 and a dummy wall 1720 in front of the in-plane profile 1710 drawn on a layout 1700. The out-of-plane radius of curvature is dependent upon a size of an opening 1730 between the in-plane profile 1710 and the dummy wall 1720. As described above, in Type 4 surface profiles, the radius of curvature in the out-of-plane direction scales with the y-coordinate according to the relation between the cosine of the incidence angle and the y-coordinate, as denoted by the defined function. This relationship is governed by the in-plane profile 1710 drawn on layout 1700 such that the out-of-plane radius of curvature is given by:

$$R(y) = R\cos(\theta) = Rg(y) \quad \text{(Equation 15)}$$

During fabrication, the out-of-plane radius of curvature is determined by the etch rate of the isotropic etching used in surface etching. In general, isotropic etching has a lag effect such that the etch rate r (or depth) is related to mask opening size s though a logarithmic function:

$$r = c_1 \ln(c_2 s + 1) \quad \text{(Equation 16)}$$

where $c_1$ and $c_2$ are calibration parameters dependent on the etching process parameters.

Using Equations 15 and 16, the modulated opening size on layout to achieve the required out-of-plane radius of curvature is given by:

$$s(y) = \frac{1}{c_2}\left[\exp\left(\frac{R_o g(y)}{c_1}\right) - 1\right] \quad \text{(Equation 17)}$$

The dummy wall 1720 drawn in front of the in-plane profile 1710 modulates the opening 1730, and achieves the desired varying out-of-plane radius of curvature versus y. The dummy wall 1720 is removed after etching of the aspherical surface.

As will be recognized by those skilled in the art, the innovative concepts described in the present application can be modified and varied over a wide range of applications. Accordingly, the scope of patents subject matter should not be limited to any of the specific exemplary teachings discussed, but is instead defined by the following claims.

We claim:
1. An optical system comprising:
   an optical reflecting element having a surface with an aspherical shape, the optical reflecting element having a principal axis perpendicular to the surface and intersecting the surface at a vertex thereof, the surface further being rotationally asymmetric around the principal axis;
   wherein the optical reflecting element is optically coupled to receive an incident beam, the incident beam having an incidence angle with respect to the surface;
   wherein the surface has an in-plane radius of curvature that spatially varies in an in-plane direction, the in-plane direction corresponding to a plane including the incident beam and the perpendicular to the surface at an incidence point;
   wherein the optical reflecting element has an in-plane cross section surface profile in the in-plane direction that is characterized in that the multiplication of the cosine of the incidence angle raised to a non-zero exponent by the in-plane radius of curvature varies less than twenty percent between any two points on the in-plane cross section surface profile; and
   wherein the in-plane radius of curvature is defined by $([1+y'^2]^{3/2})/y''$, where y' is a first derivative of y with respect to x, y'' is a second derivative of y, and x and y are variables of an x-y coordinate system oriented such that the incident beam is incident in parallel with respect to the x-axis.

2. The optical system of claim 1, further comprising:
a substrate having the optical reflecting element etched therein using a lithographic and deep etching technique to define the in-plane cross section surface profile.

3. The optical system of claim 2, wherein the substrate is a silicon-on-insulator wafer.

4. The optical system of claim 1, wherein the non-zero exponent is 1 and the in-plane cross section surface profile is defined by: $2f_o y''-y'^3-y'=0$;
wherein $f_o$ is a parameter controlling a focal length of the optical reflecting element;
wherein y' is a first derivative of y with respect to x;
wherein y" is a second derivative of y; and
wherein x and y are coordinates of an orthogonal coordinate system that identify a point on the in-plane cross section surface profile.

5. The optical system of claim 4, wherein:
the optical reflecting element is further optically coupled to reflect the incident beam at a reflection angle; and
a first change in a distance between the incident beam and the principal axis produces a second change in the reflection angle, the second change being linearly related with the first change.

6. The optical system of claim 4, further comprising:
a translation device coupled to the optical reflecting element, the translation device having two degrees of freedom of motion to cause a displacement of the optical reflecting element along a translation path defined by the orthogonal coordinate system.

7. The optical system of claim 6, wherein the translation path is substantially identical to the in-plane cross section surface profile.

8. The optical system of claim 7, further comprising:
an optical source optically coupled to provide the incident beam;
wherein the translation device is further configured to cause motion of the optical reflecting element such that a substantially constant distance between the optical source and the optical reflecting element is maintained across the translation path.

9. The optical system of claim 1, wherein the non-zero exponent is 1 and the in-plane cross section surface profile is defined by:

$$2\left(\frac{y}{m}+d-x\right)y''+y'^3+y'=0;$$

wherein d is a parameter controlling a focal length of the optical reflecting element;
wherein m is a parameter defining a family of in-plane cross section surface profiles;
wherein x and y are coordinates of an orthogonal coordinate system that identify a point on the in-plane cross section surface profile;
wherein y' is a first derivative of y with respect to x; and
wherein y" is a second derivative of y.

10. The optical system of claim 9, further comprising:
a translation device coupled to the optical reflecting element, the translation device having one degree of freedom of motion in a direction that makes an angle β with respect to the incident beam to cause a displacement of the optical reflecting element along a translation path defined by the orthogonal coordinate system.

11. The optical system of claim 10, wherein 1≤m≤3 and β=arctan of m.

12. The optical system of claim 1, wherein the non-zero exponent is −1 and the in-plane cross section surface profile is defined by: $2f_o y''y'-[1+y'^2]^2=0$;
wherein $f_o$ is a parameter controlling a focal length of the optical reflecting element;
wherein y' is a first derivative of y with respect to x;
wherein y" is a second derivative of y; and
wherein x and y are coordinates of an orthogonal coordinate system that identify a point on the in-plane cross section surface profile.

13. The optical system of claim 12, wherein:
the optical reflecting element is further optically coupled to reflect the incident beam at a reflection angle;
the incidence angle is larger than 60 degrees; and
a first change in a distance between the incident beam and the principal axis produces a second change in the reflection angle, the second change being disproportionately greater than the first change.

14. The optical system of claim 1, wherein:
the optical reflecting element has a curved out-of-plane cross section surface profile in an out-of-plane direction that corresponds to another plane that includes the incident beam and that is perpendicular to the in-plane direction;
a center of curvature of the surface varies in the in-plane direction; and
an out-of-plane radius of curvature of the surface in the out-of-plane direction varies in the in-plane direction.

15. The optical system of claim 14, wherein the out-of-plane radius of curvature decreases with increasing distance from the principal axis in the in-plane direction.

16. The optical system of claim 14, further comprising:
a substrate having the optical reflecting element etched therein using a lithographic and deep etching technique including an etching mask opening, the out-of-plane cross section surface profile being controlled by varying a size of the etching mask opening.

17. The optical system of claim 16, wherein the size of the etching mask opening is determined by $$s(y)=\frac{1}{c_2}\left[\exp\left(\frac{R_o g(y)}{c_1}\right)-1\right];$$

wherein $c_1$ and $c_2$ are calibration parameters;
wherein $R_o$ is a maximum out-of-plane radius of curvature; and
wherein g(y) is a function varying with a distance y from the principal axis along the in-plane direction.

18. The optical system of claim 1, wherein the non-zero exponent is 1 and the optical reflecting element is a convex reflecting element, and further comprising:
an optical source optically coupled to provide the incident beam; and
a concave reflecting element optically coupled to receive the incident beam from the optical source and reflect the incident beam as an intermediate beam towards the convex reflecting element, the convex reflecting element reflecting the intermediate beam to produce an output beam;
wherein a location of a beam waist of the incident beam is in front of the concave reflecting element, a location of a beam waist of the intermediate beam is behind the convex reflecting element and a location of a beam waist of the output beam is behind the convex reflecting element.

19. The optical system of claim 18, wherein beam collimation efficiency of the output beam is maximized by setting $$d_1 = f_{conc} + \frac{f_{conc}^2}{d_2 - f_{conc} - f_{conv}};$$

wherein $d_1$ is the distance between the location of the beam waist of the incident beam and a surface of the concave reflecting element;

wherein $d_2$ is the distance between the location of the beam waist of the intermediate beam and the surface of the convex reflecting element;

wherein $f_{conc}$ is an effective focal length of the concave reflecting element; and wherein $f_{conv}$ is an effective focal length of the convex reflecting element.

20. The optical system of claim 19, wherein at least one of the convex reflecting element and the concave reflecting element are moveable.

21. The optical system of claim 1, wherein the optical reflecting element is a first optical reflecting element, the non-zero exponent is 1, and the first optical reflecting element has a flat cross section surface profile in an out-of-plane direction corresponding to another plane that includes the incident beam and that is perpendicular to the in-plane direction, and further comprising:
  a second optical reflecting element that has a flat cross section surface profile in the in-plane direction and a curved cross section surface profile in the out-of-plane direction; and
  an optical source optically coupled to direct the incident beam towards the second optical reflecting element, the second optical reflecting element reflecting the incident beam towards the first optical reflecting element, the first optical element reflecting the incident beam to produce an output beam.

22. The optical system of claim 21, wherein:
  the output beam is collimated in the in-plane direction using the first optical reflecting element by setting a distance between the optical source and the first optical reflecting element equal to a first focal length of the first optical reflecting element; and
  the output beam is collimated in the out-of-plane direction using the second optical reflecting element by setting a distance between the optical source and the second optical reflecting element equal to a second focal length of the second optical reflecting element.

23. The optical system of claim 22, wherein at least one of the first optical reflecting element and the second optical reflecting element are moveable.

24. The optical system of claim 23, wherein the first optical reflecting element is moveable in the in-plane direction and the second optical reflecting element is moveable in the out-of-plane direction to enable the optical system to operate as a raster optical beam scanner.

25. The optical system of claim 21, further comprising:
  a third optical reflecting element optically coupled to receive the incident beam from the optical source and to reflect the incident beam towards the second optical reflecting element.

26. The optical system of claim 25, wherein at least the first optical reflecting element is moveable such that the incidence angle of the incident beam on the surface of the first optical reflecting element is fixed and a spot size of the output beam varies in the in-plane direction.

27. The optical system of claim 25, wherein at least the second optical reflecting element and the third optical reflecting element are moveable such that respective incidence angles of the incident beam on respective surfaces of the second optical reflecting element and the third optical reflecting element are fixed and a spot size of the output beam varies in the out-of-plane direction.

28. The optical system of claim 25, wherein at least one of the first optical reflecting element and the second optical reflecting element is moveable in two orthogonal directions to cause deflection of the output beam relative to the incident beam along one of the two orthogonal directions and adaptation of a spot size of the output beam along the other of the two orthogonal directions.

29. The optical system of claim 25, wherein the first optical reflecting element, the second optical reflecting element and the third optical reflecting element are moveable such that respective incidence angles of the incident beam on respective surfaces of the first optical reflecting element, the second optical reflecting element and the third optical reflecting element are fixed and a spot size of the output beam varies independently in the in-plane direction and the out-of-plane direction to enable the optical system to operate as a radial optical beam scanner.

30. The optical system of claim 1, further comprising:
  a first translation device coupled to the optical reflecting element and moveable in the in-plane direction to cause a displacement of the optical reflecting element in the in-plane direction;
  an optical source optically coupled to provide the incident beam;
  a second translation device moveable in the out-of-plane direction and coupled to enable the incident beam to be directed towards the aspherical optical reflecting element;
  a first silicon-on-insulator (SOI) wafer having the optical reflecting element and the first translation device fabricated therein; and
  a second SOI wafer having the second translation device fabricated therein, the optical source being further integrated on the second SOI wafer;
  wherein the first SOI wafer and the second SOI wafer are bonded together.

* * * * *